(12) United States Patent
Maager

(10) Patent No.: US 11,974,673 B2
(45) Date of Patent: May 7, 2024

(54) METHOD FOR CONSTRUCTING A PIECE OF FURNITURE

(71) Applicant: Frank Maager, Sulzburg (DE)

(72) Inventor: Frank Maager, Sulzburg (DE)

( * ) Notice: Subject to any disclaimer, the term of this patent is extended or adjusted under 35 U.S.C. 154(b) by 658 days.

(21) Appl. No.: 17/059,600

(22) PCT Filed: May 31, 2019

(86) PCT No.: PCT/EP2019/064205
§ 371 (c)(1),
(2) Date: Nov. 30, 2020

(87) PCT Pub. No.: WO2019/229244
PCT Pub. Date: Dec. 5, 2019

(65) Prior Publication Data
US 2021/0215181 A1 Jul. 15, 2021

(30) Foreign Application Priority Data
Jun. 1, 2018 (DE) ...................... 10 2018 208 676.1

(51) Int. Cl.
*A47B 96/20* (2006.01)
*A47B 3/06* (2006.01)
(Continued)

(52) U.S. Cl.
CPC .............. *A47B 96/201* (2013.01); *A47B 3/06* (2013.01); *A47B 47/042* (2013.01);
(Continued)

(58) Field of Classification Search
CPC ....... A47B 96/201; A47B 3/06; A47B 47/042; A47B 87/002; A47B 2220/0058; A47B 2230/02; A47B 2230/11; A47B 2230/12
(Continued)

(56) References Cited

U.S. PATENT DOCUMENTS 3,389,666 A * 6/1968 Schultze-Bonatz ......................... A47B 47/042
108/17
4,150,630 A * 4/1979 Pokorny ................. A47B 91/16
108/90

(Continued)

FOREIGN PATENT DOCUMENTS

| CN | 207249213 U | 5/2018 |
|---|---|---|
| DE | 1946626 | 3/1971 |

(Continued)

OTHER PUBLICATIONS

International Search Report for corresponding application PCT/EP2019/064205 filed May 31, 2019; dated Aug. 7, 2019.

*Primary Examiner* — Jose V Chen
(74) *Attorney, Agent, or Firm* — CANTOR COLBURN LLP

(57) ABSTRACT

A system for constructing a piece of furniture, partitions or an exhibition stand, the system including a supporting structure which has a flat shape and has a plurality of side edges, where interfaces embodied and designed for connection to other system components are provided on at least two edges, where at least one adjusting element is interlockingly and/or frictionally attached to the interfaces arranged on the edges and pertaining to the at least one supporting structure, where the interfaces are arranged in the edges of the supporting structure and protected by the supporting structure being at least partially built into the supporting structure and arranged in recesses provided in the side edges, and the at least one adjusting element is attached to the interfaces by means of a mating part to the respective interface resulting in a flexible, modular system with interfaces on the edges of a supporting structure, by means of which all of the functions of a piece of furniture can be covered.

24 Claims, 20 Drawing Sheets

(51) Int. Cl.
*A47B 47/04* (2006.01)
*A47B 87/00* (2006.01)

(52) U.S. Cl.
CPC .......... *A47B 87/002* (2013.01); *A47B 87/007* (2013.01); *A47B 2220/0058* (2013.01); *A47B 2230/02* (2013.01); *A47B 2230/11* (2013.01); *A47B 2230/12* (2013.01)

(58) Field of Classification Search
USPC .......................................... 108/158.12, 157.1
See application file for complete search history.

(56) References Cited

U.S. PATENT DOCUMENTS

| | | | | |
|---|---|---|---|---|
| 4,686,910 | A * | 8/1987 | Skjerseth | A47B 3/02 |
| | | | | 108/118 |
| 5,601,036 | A * | 2/1997 | Kieser | A47B 9/14 |
| | | | | 108/107 |
| 2004/0217678 | A1 * | 11/2004 | Lin | A47B 47/042 |
| | | | | 312/265.5 |
| 2013/0287484 | A1 * | 10/2013 | Phillips | A47B 47/042 |
| | | | | 403/298 |
| 2014/0331903 | A1 * | 11/2014 | Massimini | A47B 13/088 |
| | | | | 108/64 |
| 2015/0028633 | A1 * | 1/2015 | Stubbs | A47B 87/002 |
| | | | | 108/106 |
| 2015/0147113 | A1 * | 5/2015 | Crabtree, II | A47B 13/021 |
| | | | | 403/292 |
| 2015/0313357 | A1 | 11/2015 | David | |
| 2015/0351537 | A1 * | 12/2015 | Grabowski | F16B 12/52 |
| | | | | 24/303 |
| 2017/0258224 | A1 * | 9/2017 | Reynolds | A47C 13/005 |
| 2018/0020822 | A1 * | 1/2018 | Miller | A47B 13/088 |
| | | | | 108/69 |
| 2018/0168347 | A1 * | 6/2018 | Yu | F16B 12/12 |
| 2018/0306225 | A1 * | 10/2018 | Boone | F16B 12/24 |
| 2018/0310707 | A1 * | 11/2018 | Berloni | F16B 12/10 |
| 2020/0196751 | A1 * | 6/2020 | Wong | A47B 85/04 |
| 2022/0142362 | A1 * | 5/2022 | Saenz | F41H 5/013 |

FOREIGN PATENT DOCUMENTS

| | | |
|---|---|---|
| DE | 29517113 U1 | 3/1996 |
| DE | 19803103 A1 | 7/1999 |
| DE | 10342994 A1 | 8/2005 |
| DE | 69918676 T2 | 8/2005 |
| DE | 202011102717 U1 | 1/2012 |
| DE | 102010042973 A1 | 4/2012 |
| EP | 0367857 A1 | 5/1990 |
| FR | 3056652 A1 | 3/2018 |
| GB | 1327143 | 4/1962 |
| WO | 2012095454 A1 | 7/2012 |
| WO | 2018195212 A1 | 10/2018 |

* cited by examiner

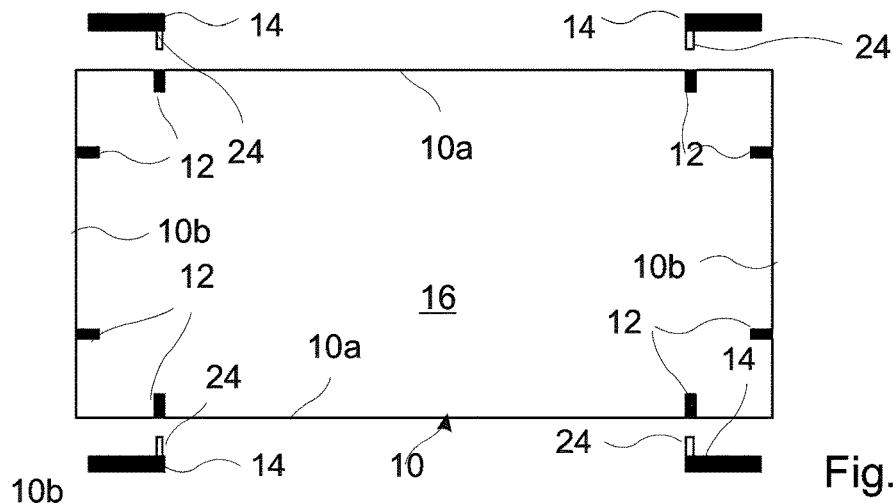
Fig. 3a
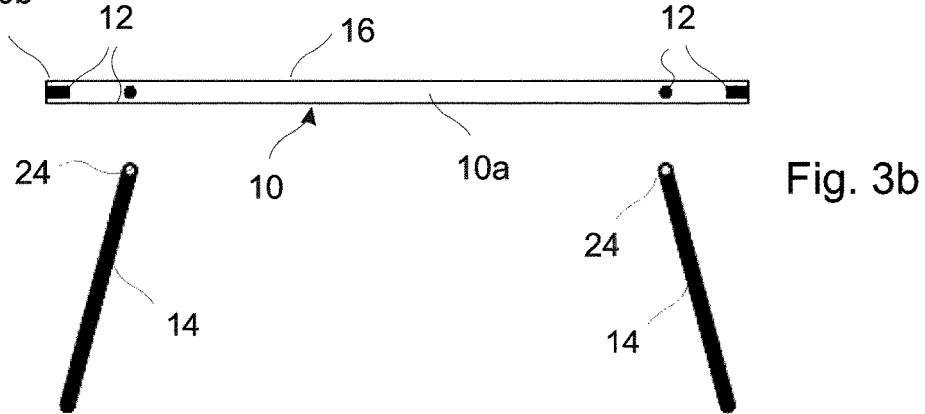
Fig. 3b
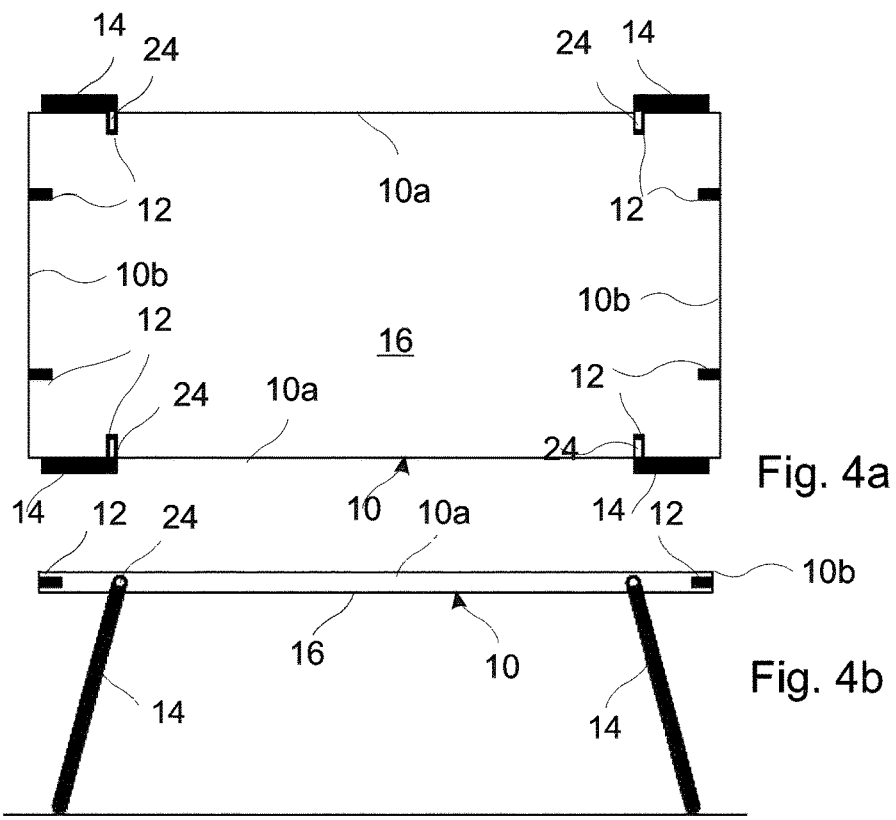
Fig. 4a
Fig. 4b

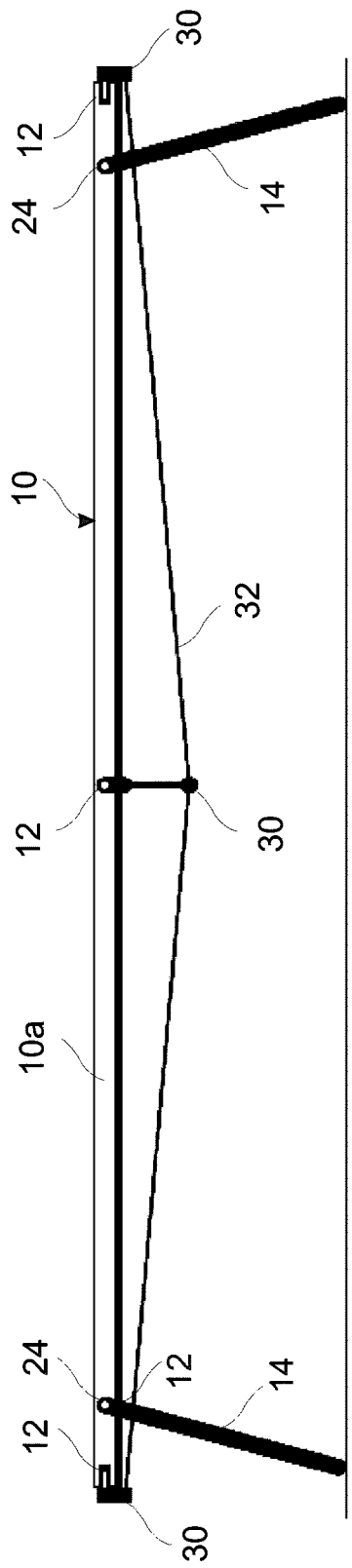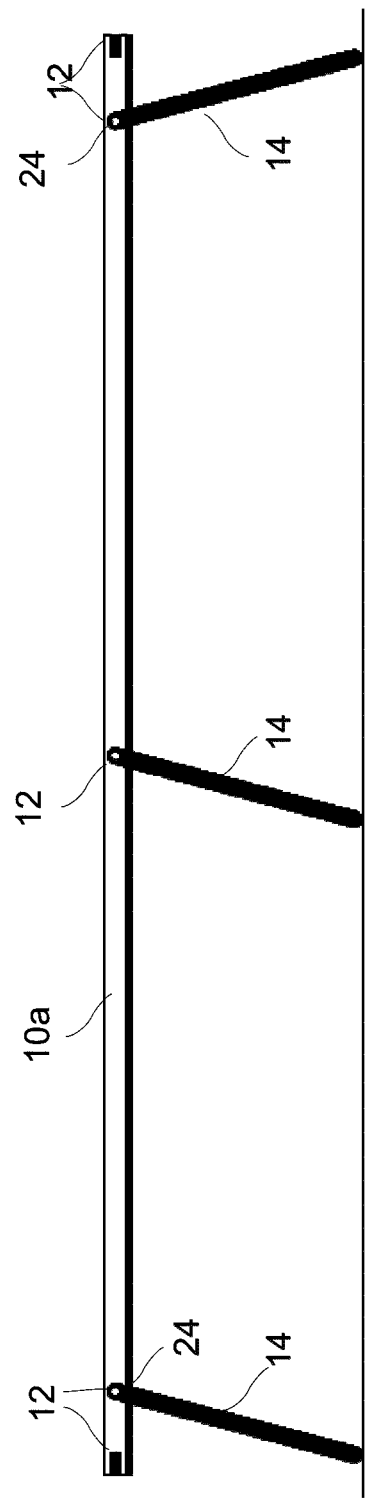

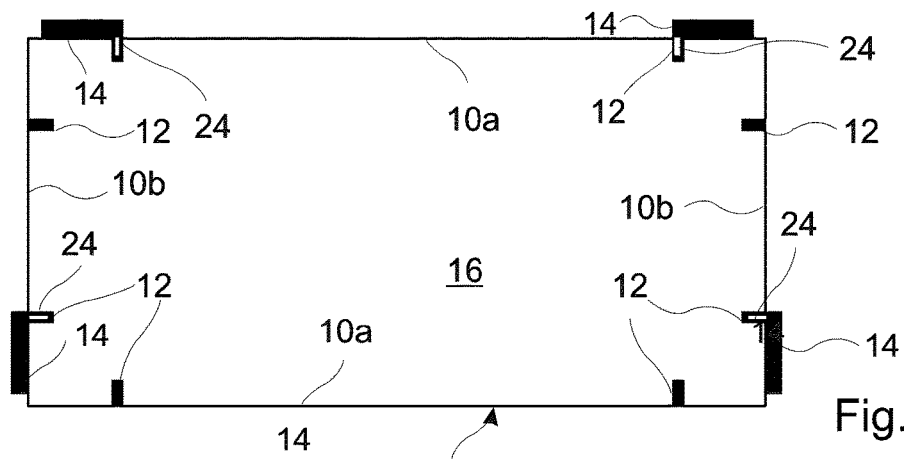
Fig. 15a
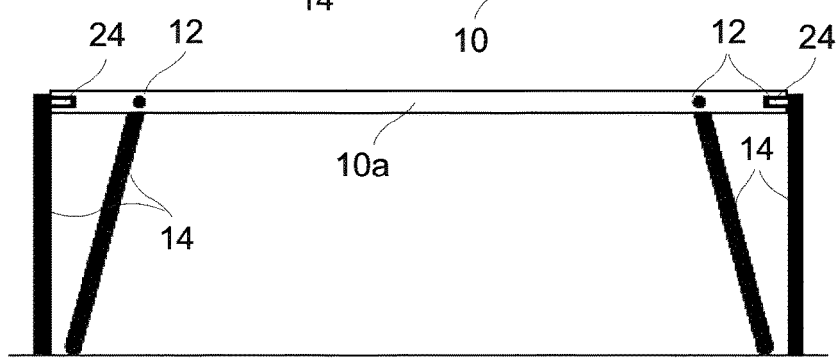
Fig. 15b
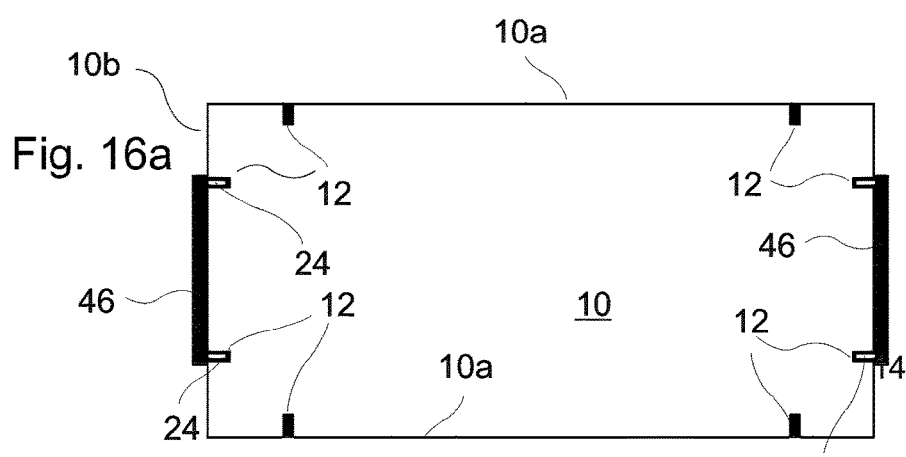
Fig. 16a
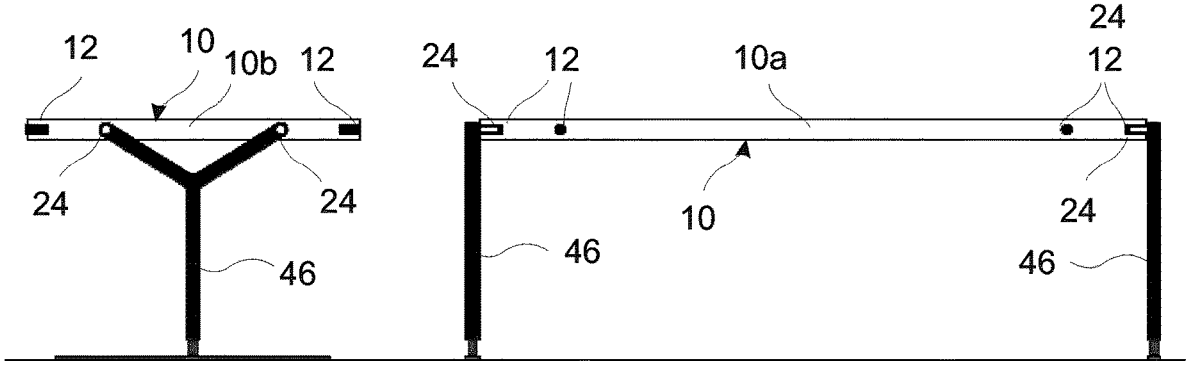
Fig. 16b
Fig. 16c

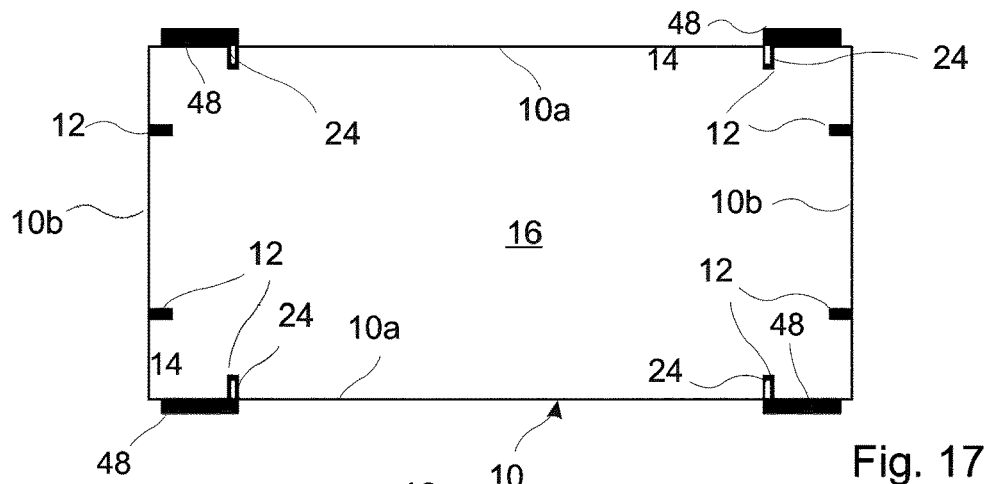
Fig. 17a
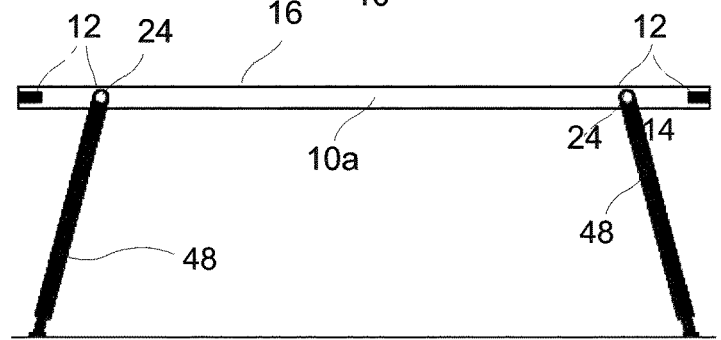
Fig. 17b
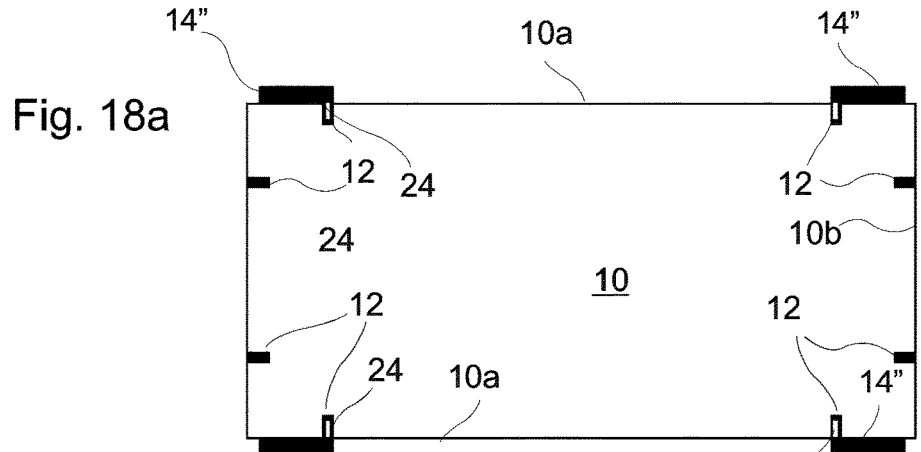
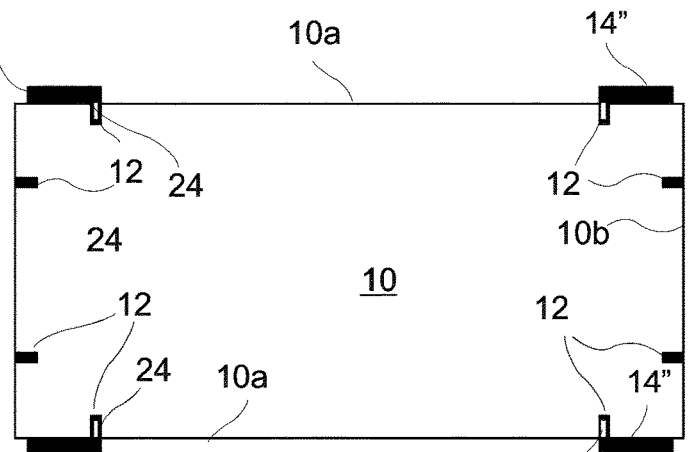
Fig. 18a
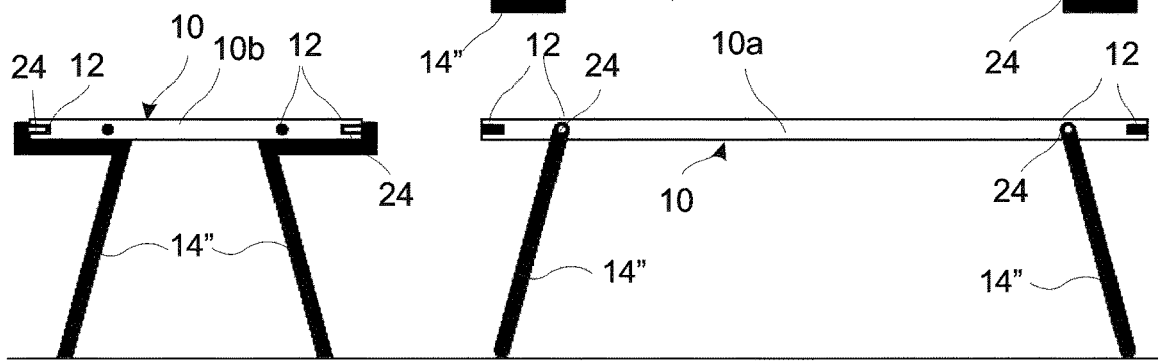
Fig. 18b          Fig. 18c

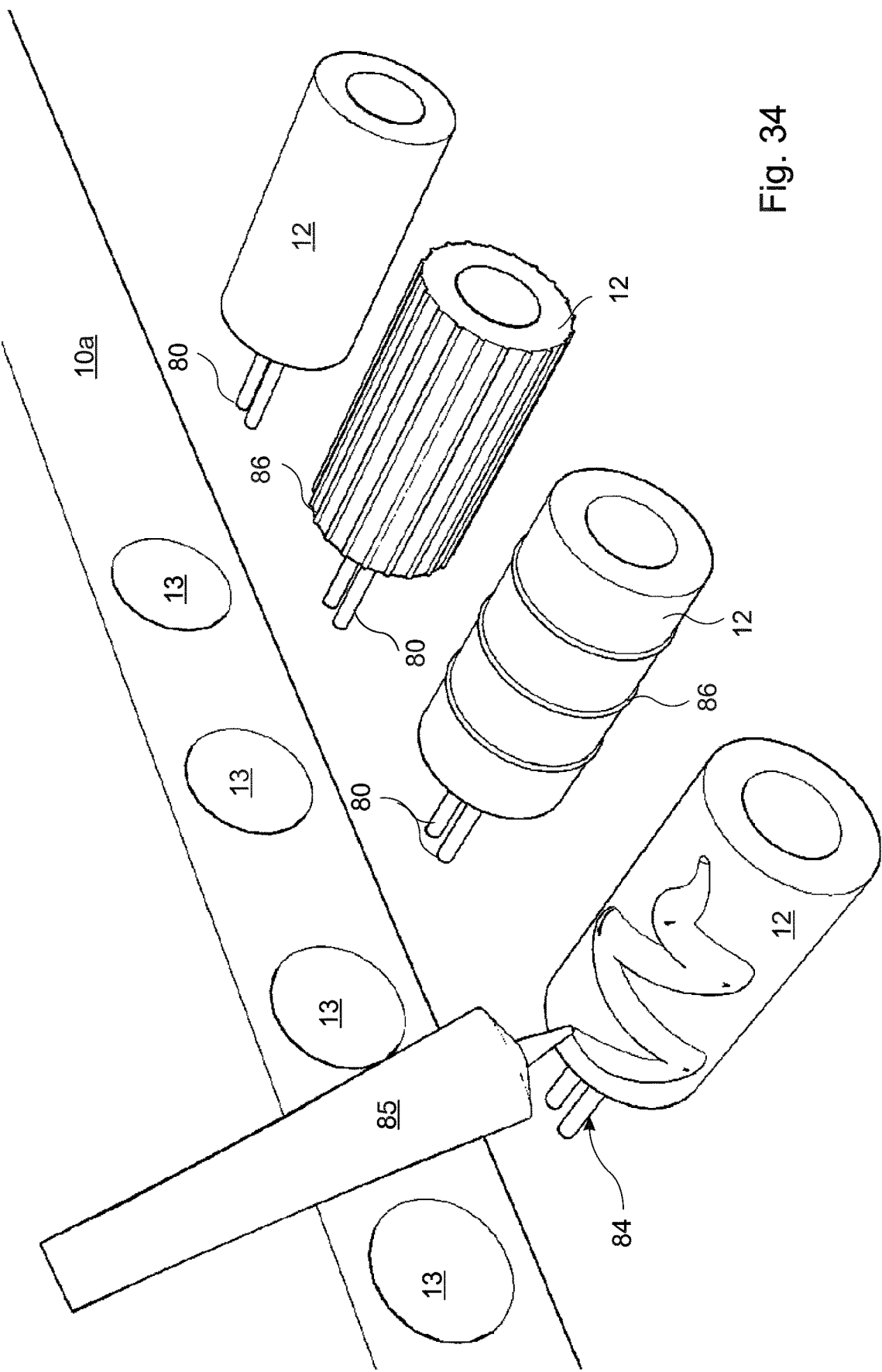

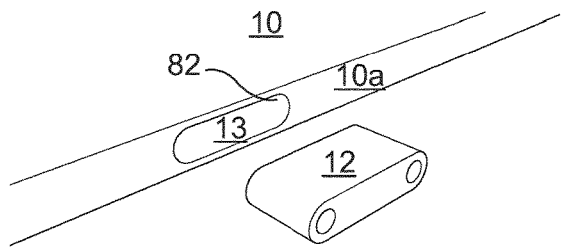
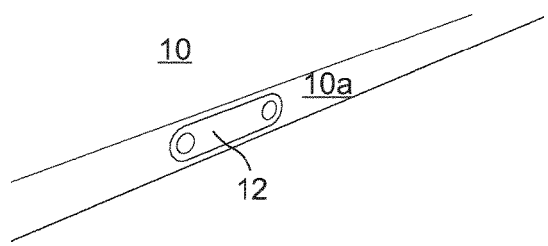
Fig. 35a  Fig. 35b
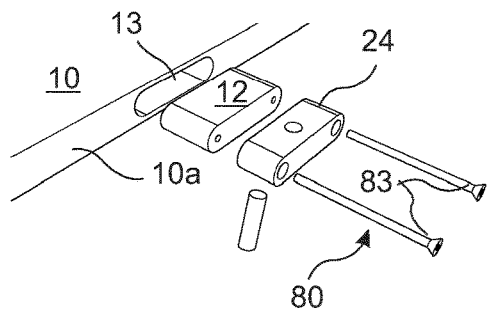
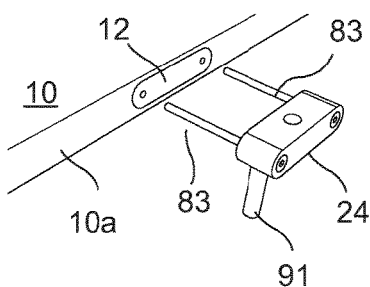
Fig. 36a  Fig. 36b
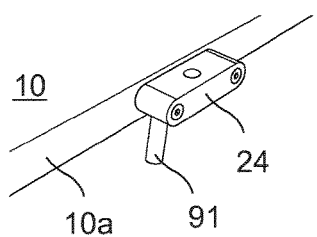
Fig. 36c

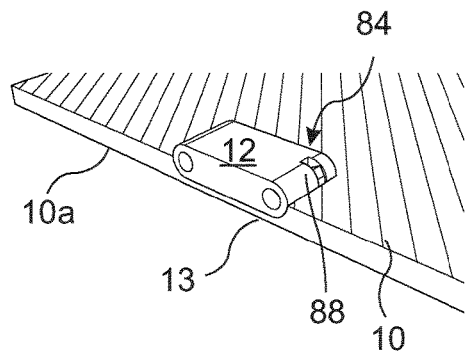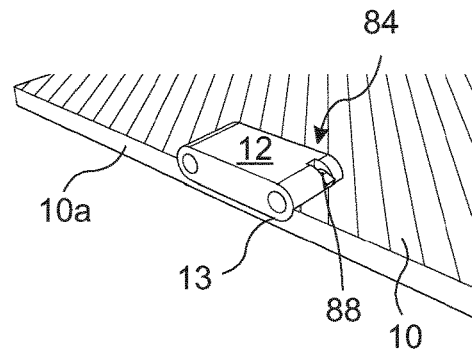
Fig. 37a    Fig. 37b
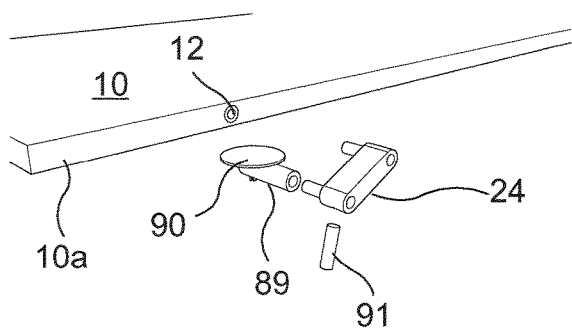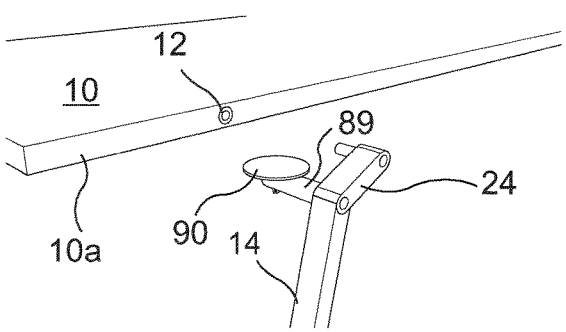
Fig. 38a    Fig. 38b
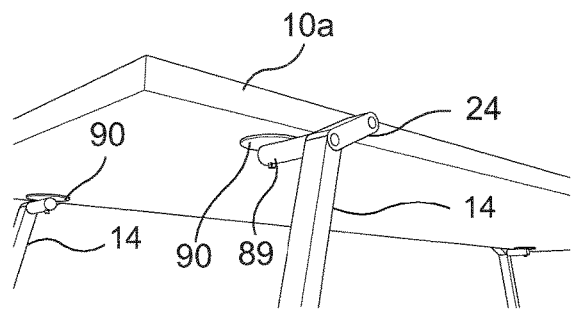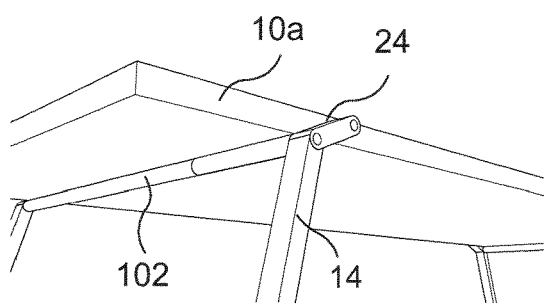
Fig. 38c    Fig. 38d

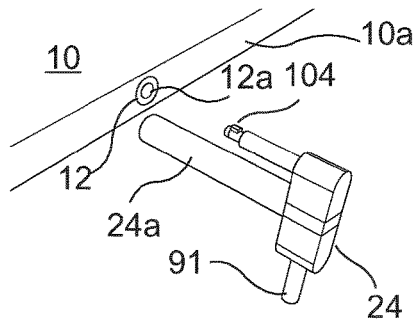 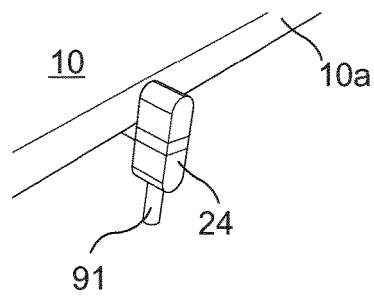
Fig. 39a  Fig. 39b
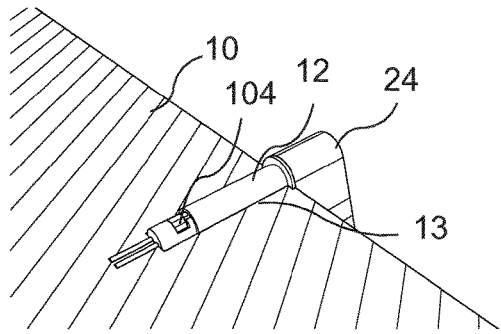 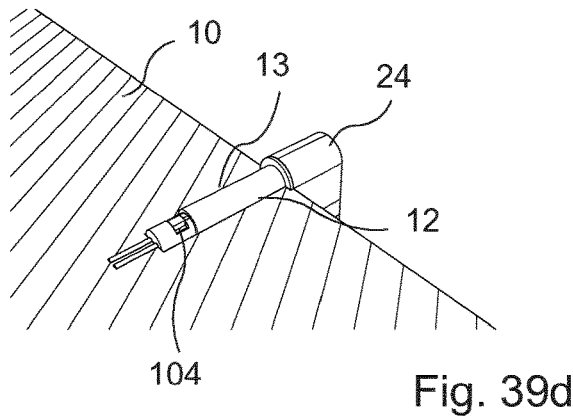
Fig. 39c  Fig. 39d
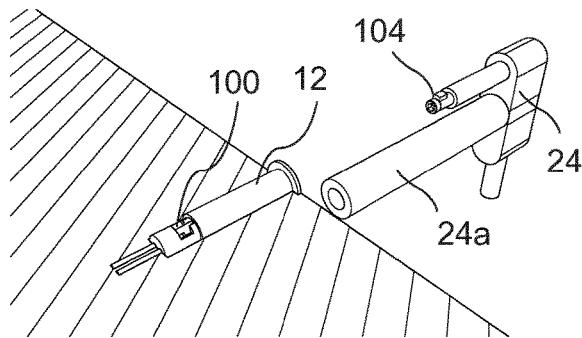
Fig. 39e

METHOD FOR CONSTRUCTING A PIECE OF FURNITURE

CROSS-REFERENCE TO RELATED APPLICATIONS

The present application refers to and claims the priority of German patent application 10 2018 208 676.1, filed on Jun. 1, 2018, the disclosure of which is hereby expressly incorporated into the subject matter of the present application in its entirety.

Field of the Invention

The invention relates to a system for constructing a piece of furniture, screens or an exhibition stand according to the preamble of claim 1 and to an associated supporting structure according to the preamble of claim 15.

In the context of this invention, the term "supporting structure" is understood to mean a structure which is intended and suitable to be a supporting element for a piece of furniture, screens or an exhibition stand. The supporting structure is formed having a surface or at least partially surrounding a surface and has a plurality of side edges with interfaces for connection to further system components. The supporting structure can also be configured as a frame on which further elements such as a tabletop can be arranged.

In the context of this invention, the term "interface" is understood to mean a component which is arranged as a separate element in recesses of a supporting structure. Therefore, the interfaces form attachment points for any elements and connections as well as for accessories. For the fastening of these elements and connections as well as accessories, mating parts are fastened to the interfaces and enter into operative connection with the interfaces.

In the context of this invention, the term "positioning element" is understood to mean an element by means of which the supporting structure can be supported, for example on the ground, or which can also be used to connect at least one further supporting structure or other elements. The positioning elements can be attached to the interfaces with the corresponding mating parts and thus can reach any spatial position. Preferably, the positioning element is a leg for setting up the supporting structure.

PRIOR ART

A wide variety of systems are known in the prior art for the construction of furniture such as tables, cupboards, shelves and the like in particular, but also for the construction of exhibition stands, wherein a supporting structure such as a tabletop, a shelf, a lying surface or seat surface is usually connected to corresponding positioning elements, such as table legs, supporting the supporting structure on the ground. This connection is usually made in such a way that the positioning elements are fastened to the underside of the supporting structure. Due to the fastening being provided in the surface of the supporting structure, the furniture is thus deprived of the possibility of using the supporting structure for other purposes, in particular, the supporting structure cannot be used on both sides.

DE 20 2011 102 717 U1, forming the basis of the preamble of the independent claims, discloses a piece of table furniture in which the structure, table extension, table connection and the usability of a tabletop on both sides are integrated in a uniformly modular constructive plug-in system. For this purpose, the corners of the tabletop have cylindrical recesses with adjacent notches formed along the edges, with two anchoring rails made of flat material being fastened one to each of these notches along the edges and thus being fastened to the edges on the front side. The notches engage with the tabletop surfaces.

DE 295 17 113 U1 discloses a table with a frame, which is built up of interconnected frame profiles. The frame has table legs that can be attached to the frame profiles at any, freely selectable position and optionally connectors for other tables and/or desk accessories. A tabletop rests on the frame profiles. The frame profile has a rectangular cross-section and a peripheral groove for fastening table legs and accessories.

DE 19 46 626 A shows a table consisting of two trestles arranged on the narrow sides and a U-shaped tabletop clamped between them, which is provided with an angled frame on its longitudinal edges, with bracing elements being arranged on the front ends of the top and additionally on the frames and being engageable from the underside of the top and the inside of the frame. The tabletop forms a U and cannot be turned over.

FR 1 327 143 A is a standard attachment of table legs to a tabletop by means of wing nuts which can be moved along a rail.

DE 198 03 103 A1 discloses a variable table frame with a turn-and-flip tabletop, under which any feet can be attached in holes or receptacles, which feet can be rotated in the longitudinal axis. Square panels can then be arranged in any desired way on these mounting surfaces. These panels have openings, holes or other recesses at the vertical butt edges of the turn-and-flip tabletops in order to connect other panels there to form corresponding large-area surfaces as composite panels.

DE 10 2010 042 973 A1 discloses a connection device for connecting furniture components, which has fittings and sleeves. The fittings are configured for fastening to the furniture components. The sleeve has a holding portion which can be brought into engagement with holding means of the third furniture component by rotating the sleeve in relation to the furniture component about a longitudinal axis of the sleeve. The first and second fittings each have a connection portion, and the connection portions can be inserted into an interior of the sleeve from one end face of the sleeve. The table leg is mounted on a split table connector. Support profiles for the tabletop are mounted on the table leg.

For the modular construction of a shelf with accessories it is known from US 2015/0313357 A1 to use a wall with a plate and a bracket. The panel has horizontal bars and the bracket has a first and second opening. The first and second openings are dimensioned to accommodate at least one of the openings of the horizontal bar. The bracket also includes a rivet for fastening the wall to the shelf.

DISCLOSURE OF THE INVENTION

Proceeding from this prior art, the present invention addresses the problem of creating a flexible, modular system with interfaces at the edges of a supporting structure as well as an associated supporting structure by which all functions of a piece of furniture can be covered.

This object is achieved by a system for constructing a piece of furniture, screens or an exhibition stand, said system having the features of claim 1 and by a supporting structure having the features of claim 15. Advantageous refinements are the subject of the dependent claims. The features individually described in the claims can be combined with each other in a technically feasible way and can be supplemented by explanatory matters from the description and by details from the Figures, in which further variants of the invention are shown.

The functions to be covered here include the connection of positioning elements such as a table leg, as well as the connection of accessory elements, functional elements, for example for the arrangement of a long tabletop or for the accommodation of any supports for elements that are usually provided against, on top of, under and next to a piece of furniture.

The functions to be covered here include the connection of positioning elements such as a table leg, as well as the connection of accessory elements, functional elements, for example for the arrangement of a long tabletop or for the accommodation of any supports for elements that are usually provided against, on top of, under and next to a piece of furniture.

For this purpose, the system initially has a supporting structure that is formed having a surface or at least partially surrounding a surface and, above all, has a plurality of side edges. At these edges, interfaces can be provided on at least two preferably opposite edges, in particular diametrically opposite edges, which interfaces are intended and suitable for connection to further system components. The supporting structure is supported, for example on the ground, by means of at least one positioning element, or at least one further supporting structure or other elements can also be connected by means of such a positioning element. The positioning element can be fastened in a positive-locking and/or force-locking manner to the interfaces of the at least one supporting structure which are arranged at the edges.

The interfaces are arranged as components separate from the supporting structure in recesses in the side edges of the supporting structure and are at least partially integrated into the supporting structure. The at least one positioning element can be fixed at the interfaces with a mating part to the respective interface. This allows a positioning element to be fastened in the side of a supporting structure, resulting in a supporting structure with laterally arranged attachment points. These attachment points can be provided for any elements and connections as well as accessories.

The integration of the interfaces opens up a wide range of possibilities with regard to the choice of materials for the supporting structure. For example, the tabletop can be a honeycomb panel in which the interfaces are integrated. The supporting structure can also be a solid board, for example made of solid wood, a chipboard or even a slab made of concrete or the like, which has lateral recesses for the interfaces.

Preferably, the interfaces are configured in such a way that at least one positioning element is operatively connected to a mating part or to an element which is complementary to the interface. This is done by positive locking and/or force locking, if necessary also by material bonding, to ensure a reliable and secure connection.

The positioning elements can be attached to the interfaces with the corresponding mating parts and thus can achieve any spatial position. This has the advantage that the supporting structure is only required laterally for the connection of further elements and for support on the floor, i.e. the supporting structure itself can be used on both sides at the other surfaces and is therefore reversible. At the same time, the structural conditions are created for coupling all the components required in the area of the piece of furniture or screens or the exhibition stand, in such a way that the supporting structure itself can remain free, i.e. as a table surface for a workplace, for example, it is completely free of other elements.

Preferably, the interface is an insert which is at least partially arranged in the recess and which can be added to the supporting structure as a component independent of the supporting structure, entirely in accordance with the manufacturer's preference. The positioning element or the accessory can then be matched to this component, or, vice versa, the appropriate insert can be selected based on the positioning element or the accessory. This opens up a multitude of design possibilities.

Preferably, the supporting structure itself is a panel-like element such as a tabletop. However, it can also be the supporting structure for a panel-like element, so that the structure actually performing the supporting function is arranged, for example, as a frame under the tabletop and has the interfaces there for the connection of further components, wherein in both cases the panel-like element remains untouched and therefore reversible. This results in a tidy and space-saving arrangement which can be adapted to the particular needs of the user, retrofitted, and extended.

In principle, interfaces of any configuration are possible as point-like or linear interfaces at any positions on all edges. In addition to the fact that the panel is reversible since the top and bottom sides remain untouched, any positioning of the positioning elements and other elements is possible at any time. In principle, existing systems can also be retrofitted as long as the edges are accessible and interfaces can be placed there in recesses, which interfaces are available, for example, in the form of fittings. For example, the legs for setting up a tabletop, seat surface, lying surface, set-down surface or leaning surface can be provided not only at the four corners of a square supporting structure, but at any other location, provided that an assured static positioning of the supporting structure is provided.

Expediently, the at least one positioning element should be fastenable transversely, preferably normal to the at least one supporting structure, i.e. it can support the supporting structure downwardly towards the floor, but it can also fasten other elements to the supporting structure in a suitable arrangement. This is an advantage if other furniture is to be assembled with the system in addition to a table. Shelves, cupboards, containers, beds, couches or other furniture as well as the construction of an exhibition stand are conceivable examples.

Advantageously, the at least one positioning element is a leg for setting up the at least one supporting structure, which is preferably a tabletop. This provides a versatile design option for one and the same table, depending on the interfaces on which the legs are arranged. The positioning element can also be configured as a lifting column or height-adjustable leg, for example as a telescopic leg, in order to implement a height adjustment.

It is advantageous if the positioning element can simultaneously be provided for the fastening of further system components, for example one of the elements formed by a seat surface, a lying surface, a set-down surface, a leaning surface, a headrest, an armrest, a backrest, etc. Any other elements are also conceivable here, provided it is ensured that they can be fastened to an interface of a supporting structure by means of a positioning element. This increases the modularity of the system and thus the versatility for the user.

In addition to the interfaces for fastening the positioning elements, supplementary interfaces can also be provided additionally or alternatively at the edges in order to fasten accessory elements at the interfaces and/or at the supplementary interfaces. It is an alternative and supplementary advantage if the accessory elements can also be fastened to the positioning elements attached to the interfaces, since then one interface can be used for a number of functions at the same time. This has the advantage that additional elements, which are usually placed on the table or on the floor, can be fastened to the supporting structure by means of the laterally attached interfaces. These include luminaires, cable ducts, partition walls, acoustic walls, screen holders, add-on tables, bins, storage compartments, drawers, loudspeakers, plant containers and, in the case of desks, all the elements required for modern office use, such as telephone holders or holders for computers, workstations and CPU holders. This has the advantage that the tabletop is freed from its function as a set-down surface for continuously required elements by the fact that these can now be attached peripherally to the edge of the supporting structure. The floor can also be freed from elements that are usually placed there, such as the bin. This means that the table surface can be used almost entirely for working, for example apart from a keyboard, making cleaning easier and faster. At the same time, elements such as the bin are more ergonomically accessible, and there are also advantages in terms of room cleaning and work safety due to the prevention of tripping.

The interfaces can also be used preferably for coupling elements which are intended for coupling to interfaces of other supporting structures. It is advantageous that this coupling element can also support a positioning element, so that, if required, one leg instead of several legs of the individual supporting structures can be provided at the interface. This also contributes to interior design and safety. At the same time, it creates the possibility of designing worktable/island combinations, room dividers or exhibition stands, as a panel composite can be produced from individual panels.

Preferably, the interfaces have an anti-rotation device to prevent the interface from rotating in relation to the supporting structure, which anti-rotation device can be configured in one or more of the following ways:

in respect of the recess, eccentric arrangement of an element to form the anti-rotation device, arrangement of a plurality of elements to form the anti-rotation device, creation of a positive-locking, non-rotatable connection between interface and supporting structure.

These alternatives ensure a reliable connection between the interface and the supporting structure, which can also safely transmit the forces occurring during use.

It is advantageous if the interface also has a securing means to prevent unintentional detachment from the supporting structure. At least one of the following solutions has proven to be helpful for this purpose:

mechanical connection or screwing of the interface to the supporting structure, materially bonded connection of the interface to the supporting structure, passive clamping of the interface with the supporting structure by means of integrally formed parts, active clamping of the interface with the supporting structure by means of manually actuatable engagement elements.

This also ensures a reliable connection between the interface and the supporting structure, which can reliably transmit the forces occurring during use.

Preferably, a level control for the supporting structure is provided on at least one positioning element between the positioning element and the supporting structure. This level control is particularly advantageous if a supporting structure is to be supported on more than three positioning elements, since the system may then be statically overdetermined. A level control can counteract any wobbling or tilting that may occur. At the same time, the supporting structure can be aligned parallel to the ground or placed horizontally in water, for example to compensate for manufacturing tolerances.

Preferably, the mating part should also be secured against rotation of the mating part with respect to the interface. This can be done in at least one of the following ways:

relative to the interface, eccentric arrangement of a positive-locking element, arrangement of a plurality of elements to form an anti-rotation device, use of an abutment.

This ensures good, secure and reliable fastening and force transfer also at the connection between mating part and interface.

It is advantageous to protect against unintentional detachment of the mating part from the interface by means of at least one of the following solutions:

force- and positive-locking connection of the mating part to the interface, force-locking connection of the mating part to the interface by means of magnetic forces, engagement of a securing element in an undercut, connection of a plurality of mating parts to each other.

This ensures the operational safety required above all in the commercial sector.

The invention is also directed to the supporting structure itself, which is configured to be suitably flat with the side edges, with interfaces being provided at the edges, which interfaces are intended and suitable for connection to further system components. At least one positioning element can be fastened in a positive-locking and/or force-locking manner at the interfaces provided at the edges. The fact that the interfaces arranged in the edges of the supporting structure and separate from the supporting structure are at least partially integrated into the supporting structure and are arranged in recesses provided in the side edges, and that the at least one positioning element can be fixed at the interfaces with a mating part to the respective interface, creates a supporting structure which can be used in a variety of ways and which can also be connected to further system components.

Preferably, the interface is an insert that is at least partially arranged in the recess and that can be added to the supporting structure as a component independent of the supporting structure, entirely as desired by the manufacturer. The positioning element or the accessory can then be matched to this component, or, vice versa, the appropriate insert can be selected on the basis of the positioning element or the accessory. This opens up a multitude of design possibilities.

Preferably, the supporting structure is a panel-like element, such as a tabletop, or carries such a panel-like element. This makes it possible to configure the panel-like element as desired, also with regard to its material. If the interface can be arranged in the panel-like element or on the panel-like element, the latter can form the supporting structure, but it is also possible, for example, to provide the supporting structure additionally in the case of a solid panel and to still achieve the same effects of high modularity.

The interface is expediently intended and suitable for attaching at least one positioning element as a leg for setting up and/or supporting the supporting structure. In this way, the coupling to the supporting structure is moved to the side of the supporting structure, so that the supporting structure itself can be configured as desired and, if necessary, is also reversible. This increases the design possibilities as well as the possibility of adapting the supporting structure to the particular requirements and geometric conditions at the installation site.

Preferably, the interfaces and, if necessary, supplementary interfaces are provided on the supporting structure, to which further elements for the construction of furniture, such as seat surfaces, armrests, backrests or set-down surfaces can be fastened. Accessory elements such as luminaires, cable ducts, brackets, branding elements or supporting or holding elements for office accessories and IT system components can also be arranged at these interfaces. The result of this is that the supporting structure is reduced to its actual function, namely to support, while the surfaces of the supporting structure can also be reduced to their particular function, namely to provide a surface for working, lying, sitting, filing and storage or the like.

Coupling elements can be fastened expediently at the interfaces to connect further supporting structures, resulting in a panel composite formed of individual supporting structures. If required, further elements can also be additionally coupled by means of the coupling elements as well as by means of the positioning elements.

Depending on the requirements and possibilities, but also depending on the material of the supporting structure, the interfaces and/or supplementary interfaces are integrated, partially integrated or attached to the panel-like elements at the edges of the panel-like element. This creates a wide range of possibilities on the one hand for adaptation to different materials, but also layout possibilities to make the fastening of elements disappear or to use this for design purposes.

Preferably, the interface can be attached to the supporting structure by means of an antirotation device to prevent the interface from rotating relative to the supporting structure, which anti-rotation device is formed by at least one of the following solutions:

in respect of the recess, eccentric arrangement of an element to form the anti-rotation device,
   arrangement of a plurality of elements to form the anti-rotation device,
   creation of a positive-locking connection between interface and supporting structure,
   connection of a plurality of mating parts to each other.

These alternatives ensure a reliable connection between the interface and the supporting structure to increase operational safety, which connection can also safely transmit the forces occurring during use.

Preferably, in order to increase the safety of use, the interface can be attached to the supporting structure by way of a securing means to prevent unintentional detachment from the supporting structure. This is done in at least one of the following ways:

mechanical connection or screwing of the interface to the supporting structure,
   materially bonded connection of the interface to the supporting structure,
   passive clamping of the interface with the supporting structure by means of integrally formed parts,
   active clamping of the interface with the supporting structure by at least one manually actuatable engagement element.

Further advantages will result from the following description of preferred embodiments as well as from the dependent claims.

BRIEF DESCRIPTION OF THE FIGURES

In the following the invention will be explained in more detail by means of embodiments shown in the Figures. The figures show:

FIG. 3a, 3b a supporting structure with adjacent positioning elements in plan view and side view, FIG. 4a, 4b a representation according to FIG. 3a, 3b with positioning elements fastened to the interfaces, FIG. 5a, 5b a side view of a supporting structure provided with positioning elements before and after the attachment of an accessory, FIG. 6, 7 two supporting structures configured as tables with positioning elements, which supporting structures are coupled together by a coupling element, before and after being coupled by the coupling element, FIG. 8 a representation according to FIG. 7 with a positioning element attached to the coupling element, FIG. 9 a long table with structural elements constructed from a supporting structure with positioning elements, FIG. 10 a long table with additional positioning elements arranged on the supporting structure, FIG. 11 a supporting structure with accessory parts fastened to it, FIG. 12a, 12b a supporting structure with a panel-like element arranged on it in a view from below and from the side FIG. 13 a plan view of a supporting structure configured as a composite panel or sandwich panel, FIG. 14 an exploded view of the supporting structure that can be integrated into a panel with interfaces integrated on it, FIG. 15a, 15b a supporting structure in plan view and side view with an alternative attachment of the positioning elements, FIG. 16a-16c a supporting structure with lifting columns as positioning element, FIG. 17a, 17b a supporting structure with height-adjustable positioning elements arranged on it, FIG. 18a-18c a supporting structure with an alternative form of positioning elements arranged on it in plan view, as well as a view from two different sides, FIG. 19 a side view of a supporting structure with positioning element, FIG. 20 a representation according to FIG. 19 with an alternative positioning element, FIG. 21 a representation according to FIG. 19 with a further alternative positioning element, FIG. 22 a representation of a supporting structure with positioning elements arranged in elongate interfaces, FIG. 23 a side view of a supporting structure with inserted positioning elements, FIG. 24 a supporting structure in side view with linear interfaces arranged thereon, to which the positioning elements are fixed in a movable manner, FIG. 25 a side view of a configuration of a piece of furniture with a supporting structure as a bench, FIG. 26 a side view of a supporting structure in a configuration as a bed, FIG. 27 a front view of a supporting structure in a configuration as a couch, FIG. 28 a front view of an embodiment with supporting structures in the form of a highboard, FIG. 29 a front view of an embodiment as a cabinet, FIG. 30 a side view of two supporting structures coupled together with a partition wall and a central leg, FIG. 31 a side view of second coupled supporting structures with a cable duct in the middle, FIG. 32 a side view of a supporting structure with a computer container coupled to it, FIG. 33a-33d eccentric arrangements of anti-rotation devices, FIG. 34 different embodiments of the interface to prevent it from rotating in the recesses of the supporting structure, FIG. 35a, 35b a positive-locking anti-rotation device to prevent the interface from rotating relative to the supporting structure, FIG. 36a-36c an interface with a securing means to prevent unintentional detachment of both the interface and the mating part, FIG. 37a, 37b an example of how to secure the interface against unintentional detachment by means of a manually actuatable engagement element, FIG. 38a-38d an interface with a level control, FIG. 39a-39e another example of how to secure the mating part at the interface by means of an undercut, FIG. 40a-40d an embodiment of an interface with a rotary lock engaging in an undercut, FIG. 41a-41d an interface with a locking element that can be actuated by a push-button, FIG. 42a-42d a further example for fixing and securing the mating part by means of magnetic forces, FIG. 43a, 43b an embodiment of a supplementary interface held in force-locking manner on the supporting body by magnetic forces.

DETAILED DESCRIPTION OF PREFERRED EMBODIMENTS

The invention will now be explained in greater detail by way of example with reference to the accompanying drawings. However, the embodiments are only examples and are not intended to limit the inventive concept to a specific arrangement. Before the invention is described in detail, it should be noted that it is not limited to the various components of the device and the various process steps, since these components and processes may vary. The terms used here are only intended to describe specific embodiments and are not used restrictively. In addition, if the description or claims use the singular or indefinite article, this also refers to a plurality of these elements, unless the overall context clearly indicates otherwise.

Figure 1A:
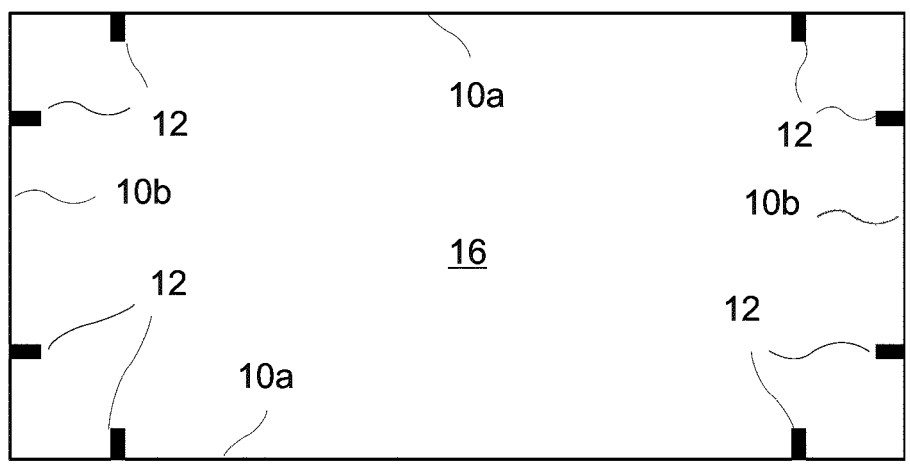
FIG. 1a, 1b a supporting structure in plan view and side view.
Figure 1B:
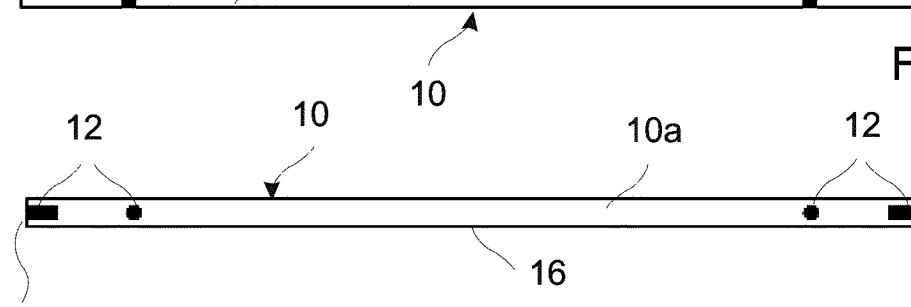
Figure 12A:
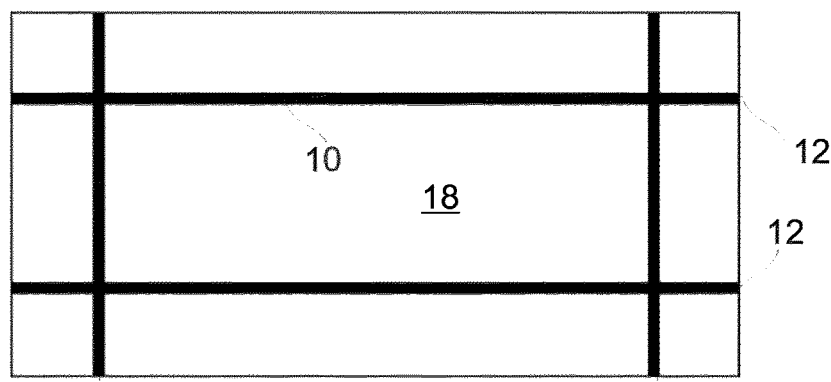
Figure 12B:
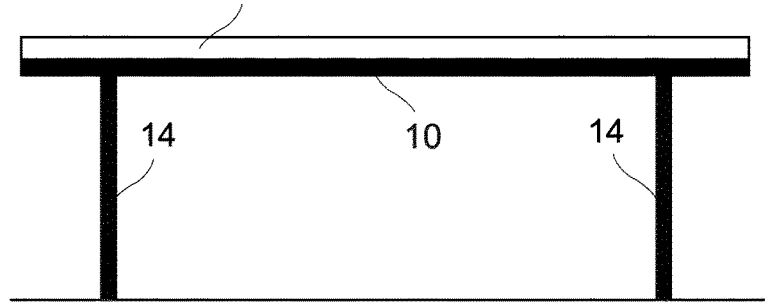

The Figures show a system for constructing a piece of furniture or an exhibition stand, said system having at least one supporting structure 10 or the supporting structure 10, which according to FIGS. 1a, 1b is configured as a flat surface or according to FIGS. 12a, 12b at least partially surrounds a surface. In the latter case, the supporting structure 10 provides a frame so to speak, on which further elements such as a tabletop can be arranged.

Figure 14:
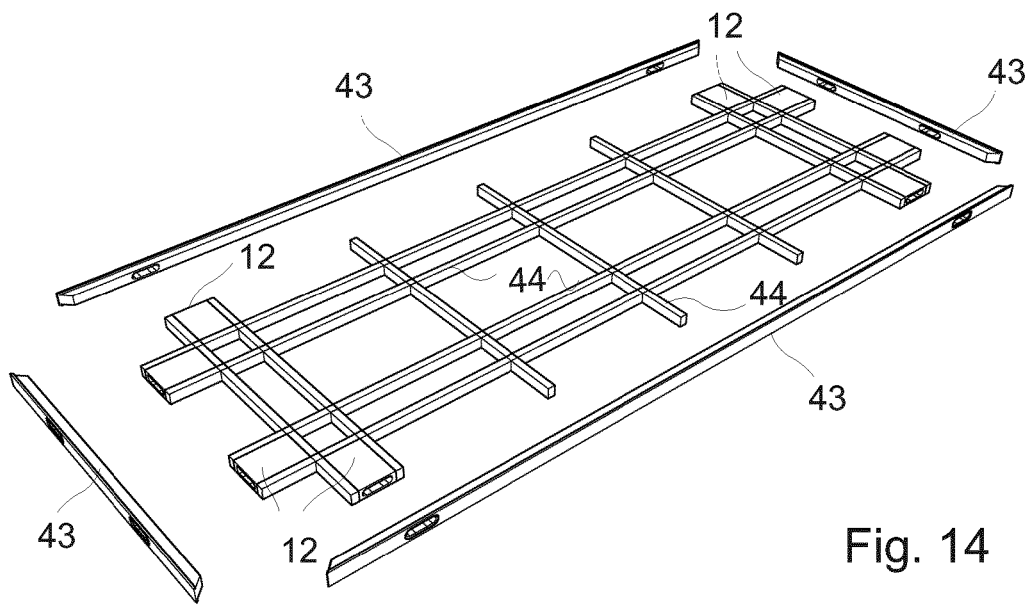

The supporting structure 10 has a plurality of side edges 10a, 10b according to the Figures and in particular according to FIGS. 1a, 1b, wherein at least two edges 10a, 10b have interfaces 12, which are arranged in recesses 13 or, as in the case of FIG. 14 for example, in receptacles similar to the recesses. The recesses 13 are described below in more detail with reference to FIGS. 33a to 43b. The interfaces 12 are preferably provided on two opposite edges, but can also be provided on all edges 10a, 10b. The interfaces 12 are used for connection to other system components. In principle, both the form of the surface and of the supporting structure, which in most cases also forms a panel-like element 16, as well as their contours can be configured as desired, as long as it is ensured that corresponding interfaces 12 and/or, if necessary, additional supplementary interfaces 20 are provided on the side edges 10a, 10b delimiting the surface.

In order to support the supporting structure on a ground surface or to connect other system components to the supporting structure, at least one positioning element 14, 14', 14" is provided, which can be fastened to the at least one supporting structure 10, preferably detachably. In FIGS. 3a, 3b, 4a, 4b the positioning elements are legs, in particular table legs for supporting the supporting structure. The at least one positioning element 14, 14', 14" can be fastened to the at least one supporting structure 10 at the interfaces 12 provided at the edges 10a, 10b in a positive-locking and/or force-locking manner, if necessary also in a materially bonded manner.

The interfaces 12 located in the edges 10a, 10b of the supporting structure 10 and separated from the supporting structure 12 are at least partially integrated into the supporting structure and are located in the recesses 13, which in turn are provided in the side edges 10a, 10b. The at least one positioning element 14, 14', 14" can be fixed at the interfaces 12 with a mating part 24 for the respective interface 12 or, as appropriate, with an element complementary to the interface 12.

Preferably, the interface 12 is an insert at least partially located in the recess 13 and will be discussed further below with regard to FIGS. 33a to 43b.

This means that a lateral interface can cover a wide range of functions, although it is not only a question of fastening the positioning element 14, 14', 14" to the supporting structure 10 and thus supporting a tabletop over a table leg, for example, but also of creating the structural conditions via the interface 12, positioning any furniture parts, attaching accessories and cleaning up the surface of the supporting structure as well as the surroundings of the piece of furniture. The application is not limited to furniture alone, and the system can also be used in principle for other fields, such as exhibition stand construction, especially when it comes to connecting screens, cabinets, tables or similar items as part of exhibition stand construction.

Preferably, the at least one supporting structure 10 is formed by a panel-like element 16, but it can also form the mere supporting structure and thus the frame for a panel-like element 18, as shown in FIGS. 12a, 12b. In the Figures, the at least one positioning element 14, 14', 14" can be fixed transversely, preferably normal to the surface of the at least one supporting structure 10. Other arrangements are also possible, however, if this is necessary for constructing a piece of furniture.

The positioning element 14, 14', 14" is preferably a leg for setting up the at least one supporting structure, but can also be a lifting column 46 for height adjustment according to FIGS. 16a to 16c or a height-adjustable leg 48 according to FIGS. 17a, 17b, which in the embodiment is configured as a telescopic leg. In principle, however, other height adjustments are also possible, for example through thread adjustments.

The at least one positioning element 14, 14', 14", in one embodiment, can also be provided for the fastening of at least one further system component, which will be discussed in more detail below. In particular, at least one of the elements comprising a seat surface, a lying surface, a set-down surface, a leaning surface, a headrest 60, an armrest 62 or a backrest 58 can be considered as system components.

In order to reliably fasten accessories to the supporting structure 10, the interfaces 12, which are provided fundamentally for fastening the positioning elements 14, 14', 14", can also be used for this purpose. Alternatively or in addition, additional supplementary interfaces 20 can be provided at the edges 10a, 10b of the at least one supporting structure 10 to fasten accessories. Likewise, the positioning elements 14, 14', 14" already attached to the interfaces 12 can again have connection possibilities for accessory elements, so that one and the same interface 12 can be used multiple times.

A very large number of elements can be considered as accessory elements, which is an indication of the modularity and versatility of the system. For example, accessory elements can include at least one of the following elements: a luminaire 26, a cable duct 72, a partition wall or acoustic wall 70, a screen holder 40 for a monitor 38, an add-on table, a bin 42, a shelf, a storage compartment, a plant container, a structural element 30, an adjusting part, a branding element for identifying certain brands, or supporting or holding elements for office accessories and IT equipment. The latter may in particular be telephone, paper tray or CPU holders, which can then be attached to at least one of the interfaces 12 or the supplementary interfaces 20 laterally on the supporting structure 10.

In order to couple different supporting structures 10 with each other, coupling elements 22 can preferably also be provided at the interfaces 12 for coupling to interfaces of further supporting structures. The coupling elements 22 are configured in such a way that they interact with the interface 12, i.e. in most cases they are elements which are complementary to the interface 12 and which, as mating part 24, ensure in a suitable way a force-locking, positive-locking or, if necessary, materially bonded operative connection.

Depending on the configuration of the supporting structure or the panel-like element 16 attached to it, the interfaces 12 and/or the supplementary interfaces 20 are preferably integrated completely or partially into the supporting structure 10 or the panel-like element 16 by fixing them in the recesses 13 or in receptacles as shown in FIG. 14. FIGS. 1a, 1b show an integrated solution, as is possible for example with a panel composite, which is then used as a panel-like element 16.

Figure 2:
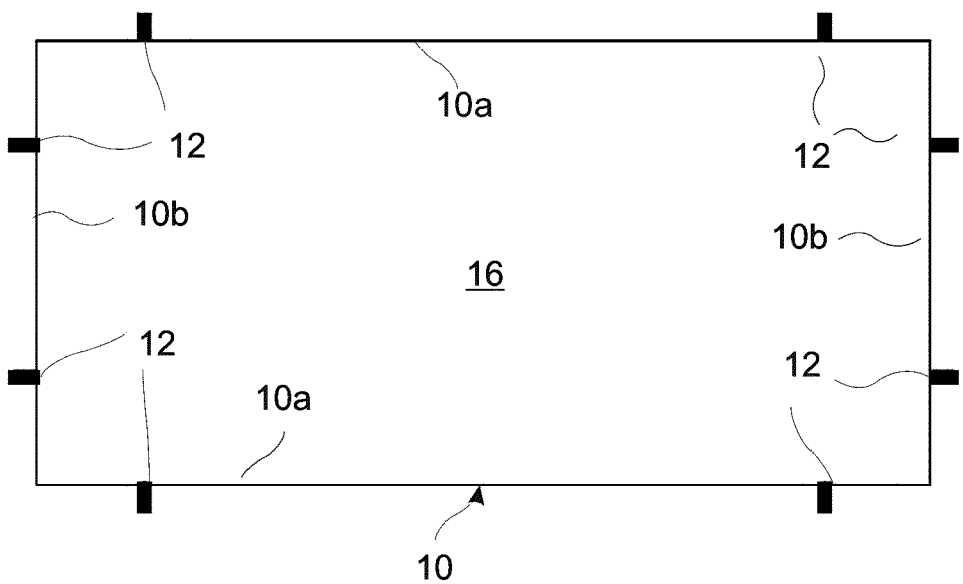
FIG. 2 a supporting structure in plan view with interfaces attached to it.

FIG. 2 shows a solution in which the interfaces 12 are arranged on the outside of the panel-like element or the supporting structure 10, which is particularly appropriate if the supporting structure is a solid element, for example made of solid wood, metal, natural stone or concrete, and/or if it is preferred for design reasons to show the interfaces 12 externally as functional elements as well.

An essential part of the system is thus the supporting structure 10 itself, which is configured and suitable for constructing a piece of furniture or even an exhibition stand together with other system components. This supporting structure 10 is formed having a surface and/or surrounds a surface at least partially or completely. It has a plurality of side edges 10a, 10b, wherein interfaces 12 are provided on at least two edges, preferably two opposite edges, and are intended and suitable for connection to other system components. It is also fundamental for the supporting structure 10 that interfaces 12 are provided on its edges—or better still edge surfaces—for fastening the at least one positioning element 14, 14', 14" in a positive-locking and/or force-locking manner or, if necessary, also in a materially bonded manner.

The supporting structure 10 is preferably formed by a panel-like element 16, but can also support a panel-like element 18 according to FIGS. 12a, 12b.

The interface 12 of the supporting structure 10 is intended and suitable to accommodate at least one positioning element 14, 14', 14" preferably as a leg, but also as a connecting or coupling element for further system components, if required. Likewise, the interface 12 can also be used to connect a lifting column 46 or a height-adjustable leg 48, so that the positioning element 14, 14', 14" can be used to set up or support the supporting structure.

As already explained, it is possible to fasten further elements to the interfaces 12 of the supporting structure 10 and/or to further additional supplementary interfaces 20 provided at the edges 10a, 10b, the components already mentioned above, such as the seat surface, armrest or other accessory elements, such as luminaires, cable ducts, etc., being preferred examples. A supporting or holding element for office accessories and IT system components can also be connected to the interfaces of the supporting structure.

The interfaces 12 can also be used to attach further supporting structures 10 by means of coupling elements 22, with the advantage that a panel composite is created.

According to FIG. 1b, the interfaces 12 are located laterally on the edges 10a, 10b. This results in a supporting structure 10 with laterally arranged connection points or connection rails. At the interfaces 12, in particular positioning elements 14, 14', 14" can be coupled with a corresponding mating part 24 or a complementary element and thus, depending on the interface, can be brought into any spatial position and also fixed there. The positioning elements 14, 14', 14" can, for example, be legs for setting up a tabletop according to FIGS. 1a to 4b, but they can also be lifting columns 46 or height-adjustable, for example telescopic legs 48 for adjusting the height of the supporting structure 10. The positioning elements 14, 14', 14" can also be used to create seat surfaces, lying surfaces or leaning surfaces, such as headrests 60, armrests 62 or backrests 58.

When the supporting structure 10 is used in conjunction with shelves and cupboards, the interfaces 12 can be used to create set-down surfaces such as sideboards, lowboards and highboards or shelves by arranging the positioning elements 14, 14', 14" accordingly. The interfaces can also be used to create screens, partition walls, acoustic walls or exhibition walls, flipcharts or guidance systems and the like.

The interfaces 12 can be provided in point-like or linear manner at any position on all edges 10a, 10b or even only on a part of the edges 10a, 10b of the supporting structure 10. This means that the supporting structure 10 or the panel-like element 16 can be used on both sides, since the top side and bottom side remain untouched. This results in a reversible panel.

FIGS. 3a to 4b show the attachment of positioning elements 14 as legs for the supporting structure 10. FIGS. 3a, 3b show the legs 14 with their elements complementary to the interfaces, which elements are not yet in the interfaces 12 in this position. By contrast, in FIGS. 4a, 4b the mating parts 24 or the complementary elements are inserted into the interfaces 12 and are fixed there in a suitable manner by force locking and/or positive locking, if necessary also by material bonding. It can be clearly seen that there is only a lateral engagement in the edges 10a, 10b of the supporting body 10. The positioning elements 14 are arranged obliquely in FIG. 4a, but they can also be fitted without being tilted.

Figure 5A:
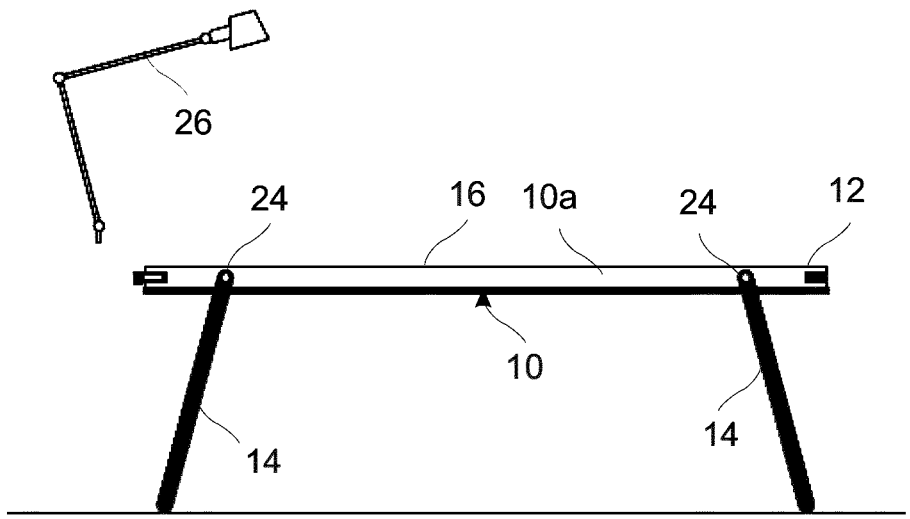
Figure 5B:
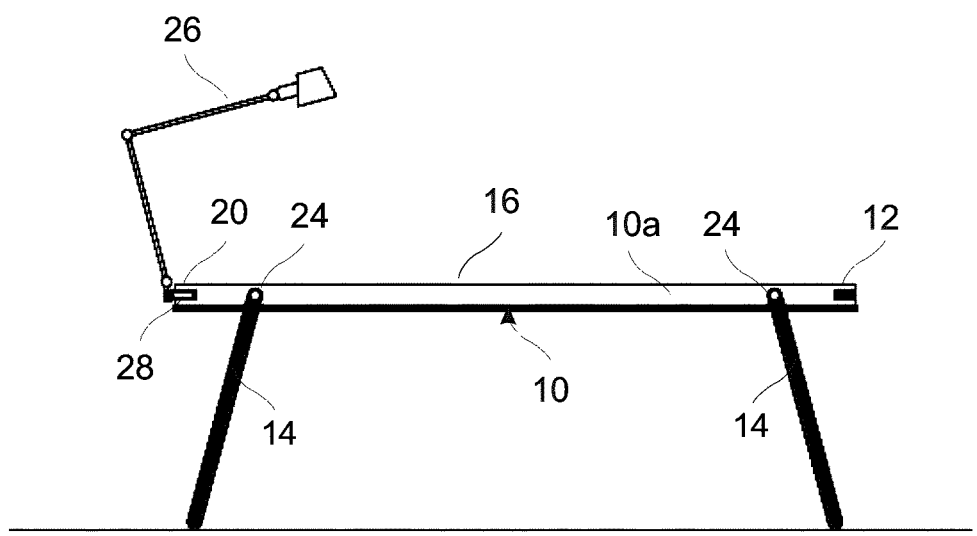

The interfaces 12 and/or any additional supplementary interfaces 20 provided on the edges 10a, 10b can preferably also be used for attaching accessories. This is shown in FIG. 5a, where a connection element 28 is already attached in the supplementary interface 20. A luminaire 26, for example, can then be attached to this connection element 28, as shown in FIG. 5b. Here too, the connection is made at the side edge, i.e. the top side of the panel-like element 16 remains free and can be used for other purposes. Examples of such accessories include, besides the luminaire 26, cable ducts 72, partition walls, screen holders 40 for monitors 38, add-on tables, bins, shelves, storage compartments, drawers, loudspeakers, plant containers.

Figure 6:
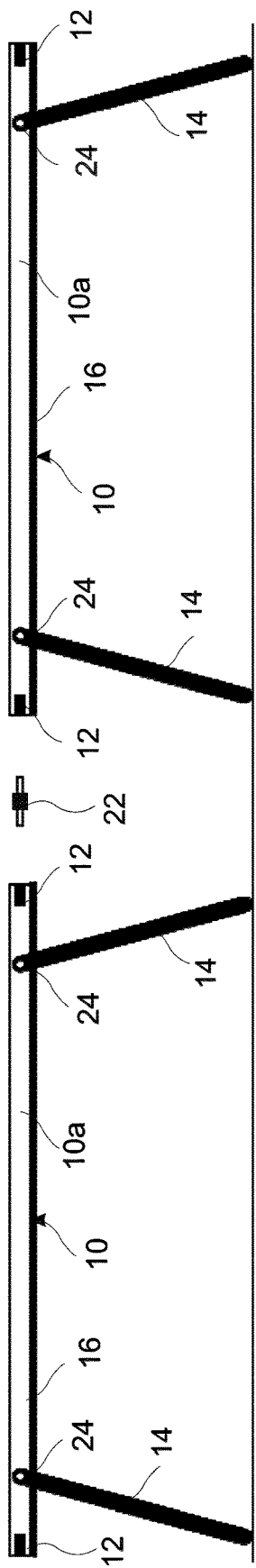
Figure 7:
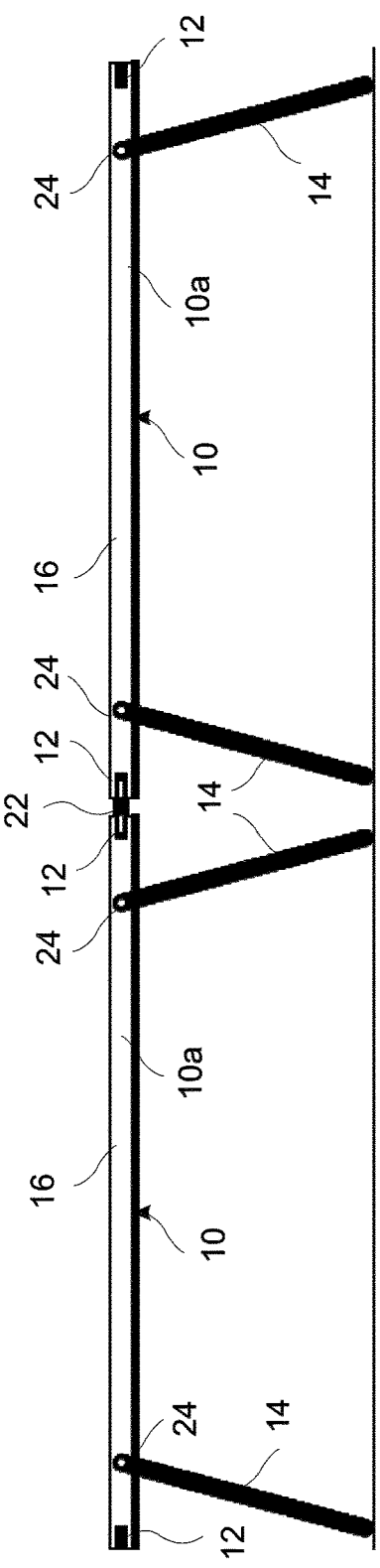
Figure 8:
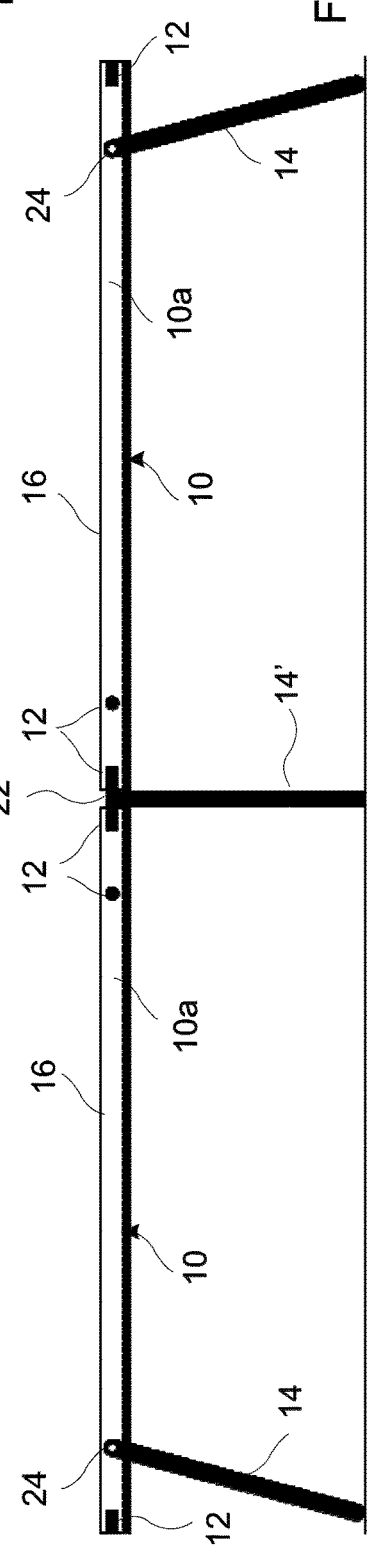

FIGS. 6 and 7 show another advantageous configuration of the modular system. In FIG. 6, two independent supporting structures with associated positioning elements 14 are provided, wherein a coupling element 22 is arranged between the two supporting structures. In FIG. 7 this coupling element is fixed in the interfaces 22 of the supporting structures 10, so that a composite of the two supporting structures is now created. In FIG. 7, the central positioning elements 14 have been left unchanged, but the positioning elements 14 can also be removed, so that a positioning element 14' can be attached to the coupling element 22 instead, in order to obtain a more streamlined design with fewer legs. Preferred fields of application for this type of use are worktable/island combinations, room dividers, screens, exhibition stands and the like.

For the construction of a long table, the interfaces 12 according to FIG. 9 can be used to provide structural elements 30 which counteract deflection of the table. In FIG. 9 a cable 32 is tensioned for this purpose to improve the moment line of the supporting structure 10. According to FIG. 10, however, a further positioning element 14 can also be provided, for example at a central interface 12.

Figure 11:
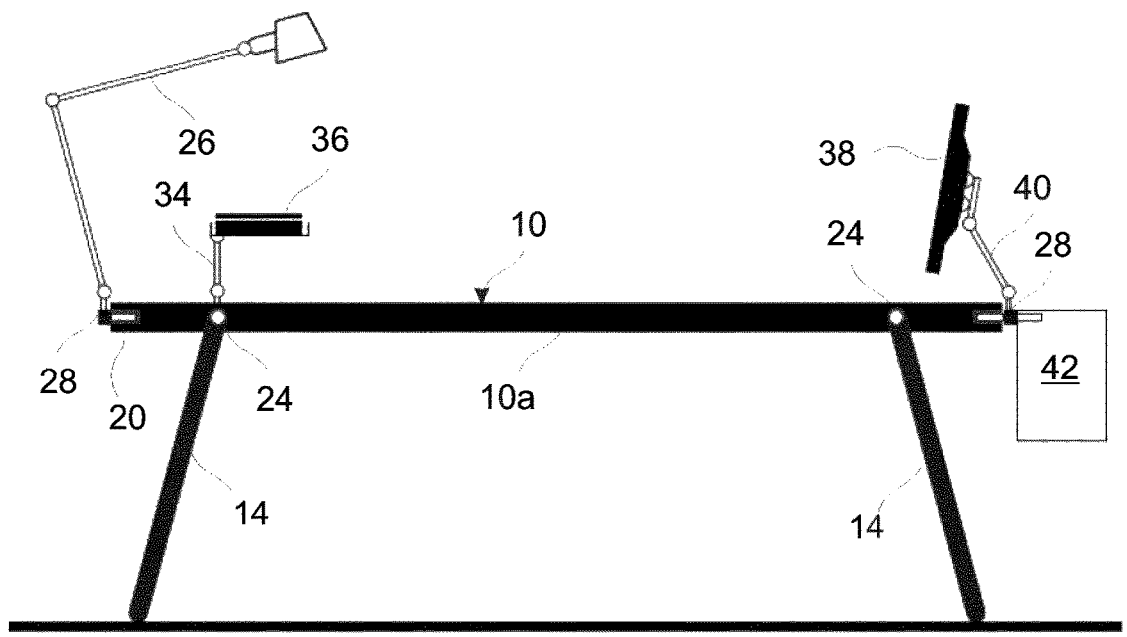

In the prior art there is regularly the problem that the surface of the supporting structure 10 is multiply occupied. If, for example, a tabletop is involved, it is often occupied as a set-down surface by permanently required elements, such as luminaires, monitors, scanners or shelves. If these can now be attached to side edges 10a, 10b of the supporting structure 10 as shown in FIG. 11, the tabletop becomes free. The same also applies in principle to the area surrounding the supporting structure 10, since elements that are permanently needed there, such as the bin, can now be placed laterally on the edges of the supporting structure 10 and at the same time can also be more ergonomically accessible. This makes it easier to clean the space and increases work safety by avoiding tripping hazards.

In addition to the luminaire 26, FIG. 11 shows a holder 34 for a telephone 36, a screen holder for a monitor 38, and the attachment of a bin 42.

The supporting structure 10 itself can be configured in different ways. FIGS. 12a, 12b show the embodiment of the supporting structure as a frame 10, to the lateral interfaces 12 of which, which cannot be seen in the Figures, the positioning elements 14 are attached. FIG. 12a clearly shows the supporting structure on which the panel-like element 18 is then arranged. The interfaces are thus located laterally on a substructure with the panel resting on it. The interfaces 12 are preferably provided externally on the supporting structure 10 in the region of the edge of the panel-like element 18.

Figure 13:
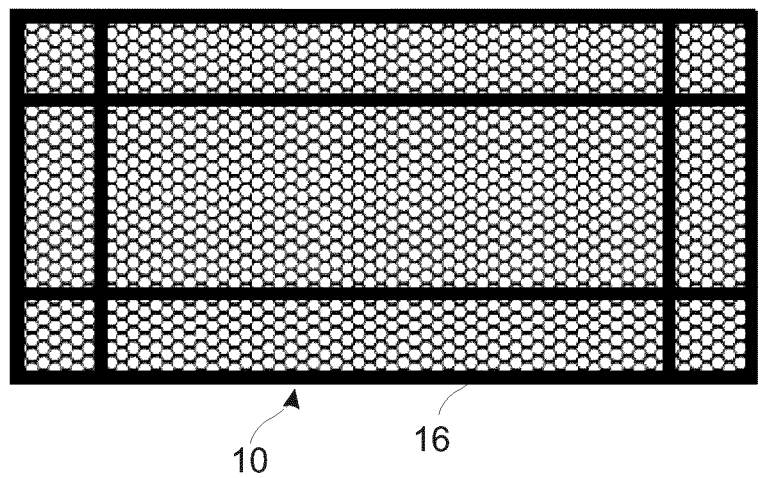

However, according to FIGS. 13, 14, the supporting structure 10 can also be configured in such a way that it is produced as a panel-like element 16 in the form of a laminated panel, for example made of wood-based materials such as multiplex or three-layer panels, or made of a material mix of different materials such as metal, plastic, foam, etc. The interfaces 12 can be positioned in principle as desired on all edges 10a, 10b of a panel, although, in the case of a sandwich panel, a structure as shown in FIG. 14 is suitable. There, stiffeners 44 are arranged in the panel, at which the interfaces 12 are also integrated, for example in receptacles. The whole structure is enclosed by frame elements 43. The structure thus formed can be covered from the top and bottom side with appropriate covering layers. This results in a sandwich composite lightweight construction with interfaces 12 integrated therein.

However, it is also conceivable to construct the supporting structure 10 or the panel-like element as a solid structure, for example from solid wood, plastic and composite material, metal materials or even mineral materials such as concrete. If, in this case, the interfaces 12 cannot be easily integrated, they can also be retrofitted to the edges, as shown according to FIG. 2. In any case, it is possible to retrofit existing supporting structures 10 with such interfaces 12.

FIG. 15a, 15b show the possible design options. Positioning elements 14 can be connected in principle to all interfaces 12. In the embodiment of FIG. 15a, 15b, the front positioning elements 14 are vertically positioned outside, while the rear positioning elements are positioned further inside. This creates space, for example to easily accommodate floor containers under a table.

The embodiment according to FIGS. 16a to 16c shows in plan view and in both side views the attachment of a lifting column 46 at the interfaces 12. For this purpose, complementary elements of the lifting column 46 engage in the interfaces 12 and can be fixed there. This creates a possibility for height adjustment.

Another possibility of height adjustment is shown in the embodiment in FIG. 17a, 17b. There, with mating parts 24 or complementary elements, height-adjustable legs 48 are attached to the interfaces 12, so that, as can be seen from the thinning of the telescopic legs in the lower area in the embodiment, they can be extended to achieve a height adjustment. However, other types of height adjustment can also be used.

In principle, any structures are conceivable for the positioning elements, with FIGS. 18a to 18c showing a possibility in which the positioning elements 14'' are indeed fixed on the outside with their mating parts 24 in the interfaces 12, but then return under the supporting structure 10 before they extend downwards towards the ground. It goes without saying that the legs can be produced and configured in a wide variety of ways, including any choice of material.

Figure 19:
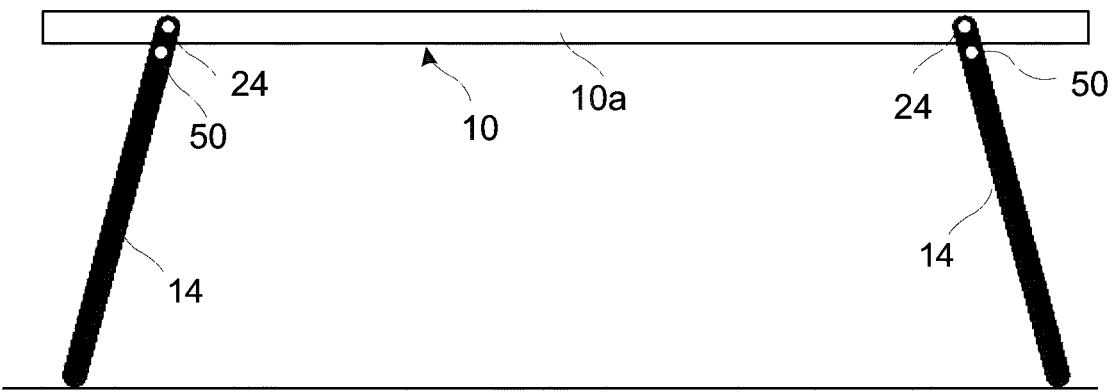

FIGS. 19 to 24 show different principles of how positioning elements 14 can be fixed to the interfaces 12. FIG. 19 shows an embodiment in which the positioning element 14 has, in addition to the mating part 24 for engagement in the interface 12, an additional holding point 50 which is located under the supporting structure 10. A tool-free, self-supporting clamp connection is created by turning the positioning elements 14 outwards.

Figure 20:
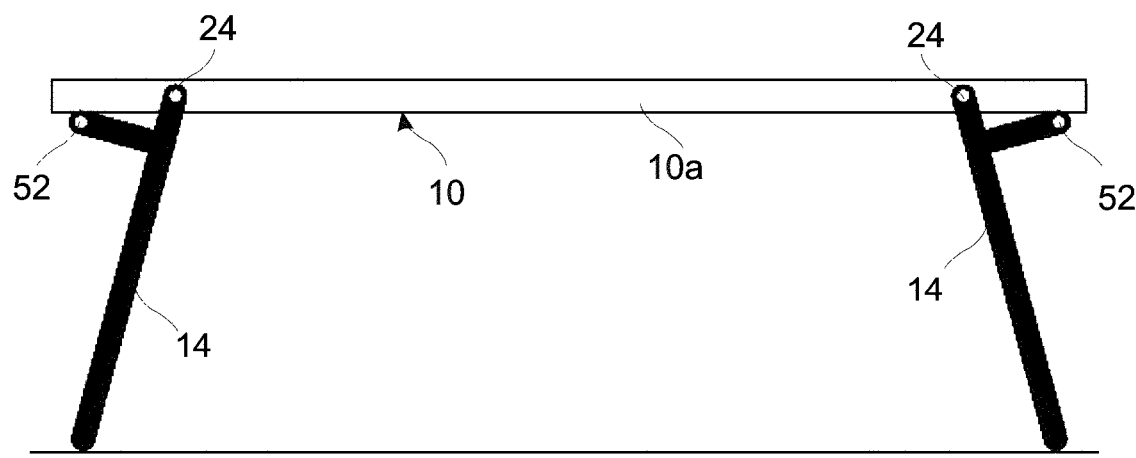

A comparable solution is shown in FIG. 20, where an additional holding point 52 is located on another arm of the positioning element 14. There too, a tool-less clamping connection is made by turning the positioning element 14 under the supporting structure 10 outwards, which is then self-supporting.

Figure 21:
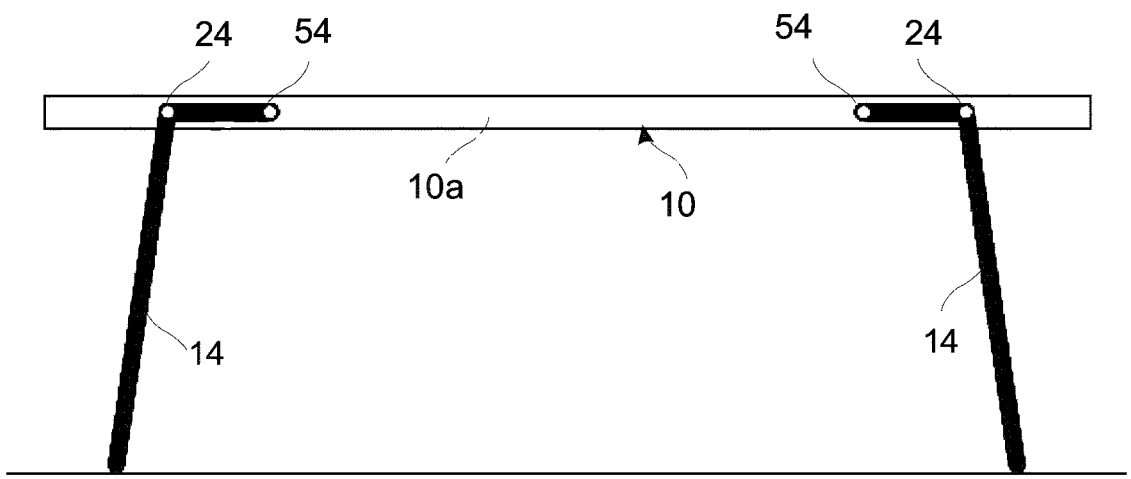

FIG. 21 shows an embodiment which illustrates that the interfaces 12 can be configured quite differently. There, the interfaces 12 are slots, i.e. the interfaces 12 can be configured in a point-like manner or linearly. In this case, the positioning element 14 is connected to the supporting structure at two points by means of the interfaces 12, wherein the further holding element 54 engages in the supporting structure in the same way as the mating part 24. These positioning elements can also still be fastened without tools.

Figure 22:
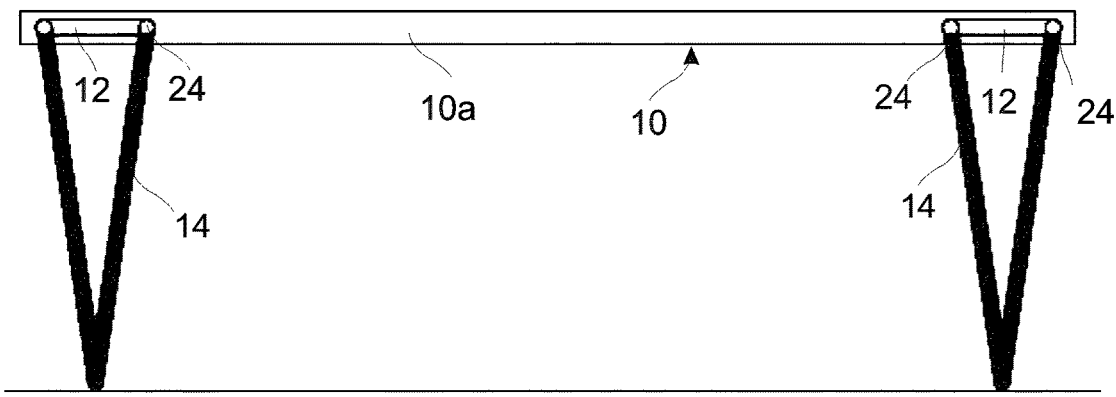
Figure 23:
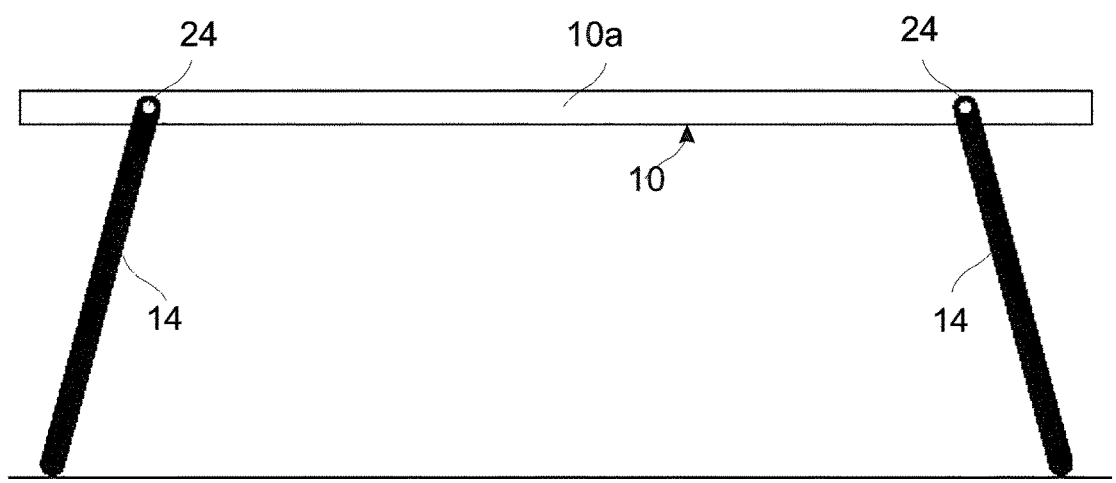

FIG. 22 shows an embodiment in which the legs are also fixed without tools, preferably by spreading them apart. In the initial state not shown in the drawing, the spacing between the upper ends of the positioning elements 14 is greater than in the state shown in FIG. 22. This results in a clamping connection by spreading along the supporting structure 10.

Figure 24:
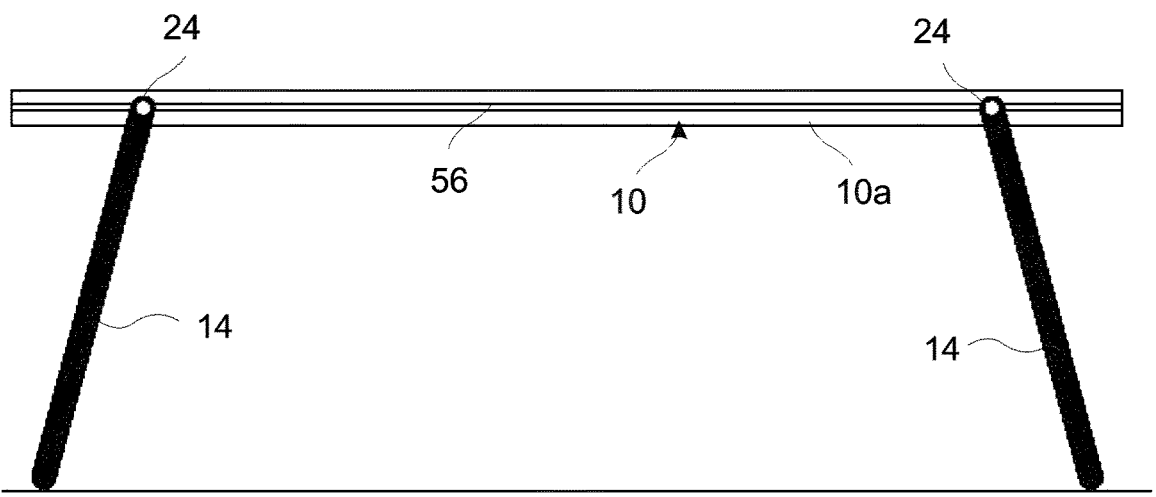

In FIG. 24, the interface is formed by a rail 56, along which the positioning element 14 can be slidably fixed. As soon as the positioning element is turned outwards, a positive-locking and force-locking connection is created.

In a way not shown in the drawings, the interfaces 12 can be configured in different ways, either on the panel side or on the element side, by forming matching interfaces 12 and complementary elements. Everything that is explained below with regard to the specification of the positioning element 14 also applies for the specification of the accessories and the other system components.

For example, it is conceivable to fix a sleeve as interface 12 to the panel-like element 16 by means of screws and then to secure the positioning element 14 in this sleeve by turning it.

Similarly, an anti-rotation device can be achieved by ensuring a positive locking, for example by making the interface 12 oval rather than round. Other shapes are also possible.

Other embodiments may include eccentric anti-rotation devices, which, for example, are rotated into a locking position while allowing the mating parts 24 to be inserted in the other position.

As shown in FIGS. 19 and 20, the system elements can also be supported by abutments, so that the interface 12 itself and the mating part 24 can be produced with less effort. In order to secure the positioning elements against unwanted movement out of position, additional locking devices can be provided to secure the mating part 24 against slipping out of the interface 12.

In principle, according to FIG. 21, one positioning element 14 can also occupy a plurality of interfaces, i.e. these are connected to each other via the positioning element 14. Either two independent mating parts 24 can be inserted into two different interfaces 12 or a block can be inserted into a larger receptacle which represents one interface.

A further securing option is provided by the use of magnets, which can be provided at the base of the interfaces 12, for example, or it is also possible to engage translational or rotational locking elements of the interface 12 with the mating part 24. In principle, there is always the possibility to connect the positioning element with the interface 12 in a known way, for example by screwing. Within the supporting structure 10 or the panel-like element, couplings can also be made through the panel to the opposite side, in order to ensure fixing. Such a fixing is also conceivable below the supporting structure.

In order to attach an accessory, this can be attached either to the interface 12 or to a supplementary interface 20, but it is also possible to attach the positioning element 14, 14', 14" in such a way that it can be attached to the positioning element.

Figure 25:
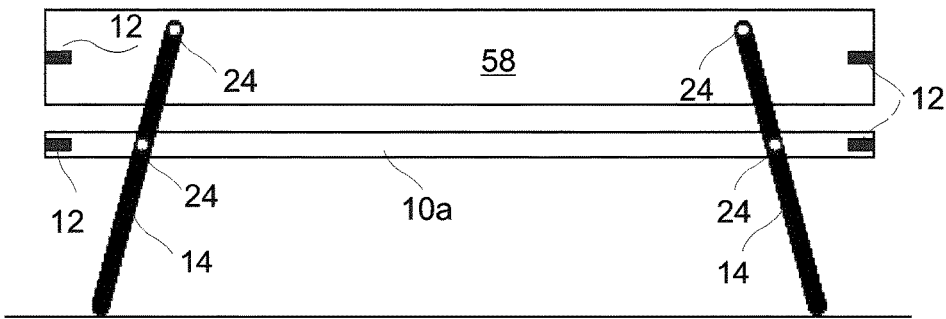
Figure 26:
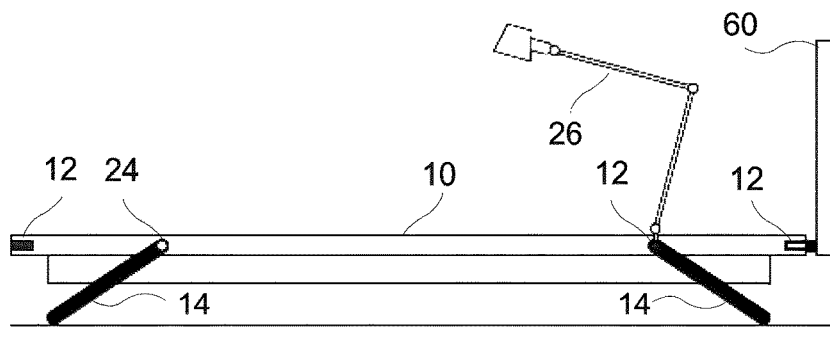

In principle, the system can also be used for other applications than furniture, screens or exhibition stands. FIG. 25, for example, shows the construction of a bench with a backrest 58, which also has corresponding interfaces 12 and is attached to the positioning element 14. FIG. 26 shows the construction of a bed, wherein a luminaire 26 is arranged at interface 12 for the positioning element 14 and a headrest 60 can be attached to the interface 12 on the front side.

Figure 27:
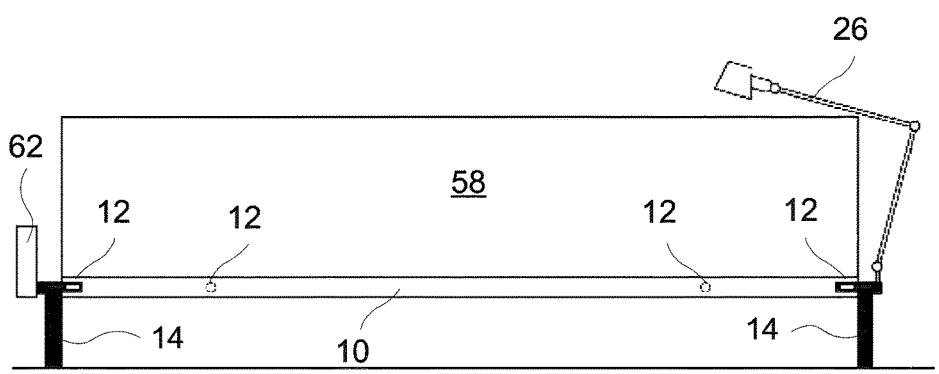

FIG. 27 shows the construction of a sofa, with the backrest 58 arranged on the supporting structure 10. An armrest 42 can be provided on the side of the positioning element 14, while a luminaire 26 can be attached on the opposite right-hand side at the interface 12 next to the positioning element 14.

Figure 28:
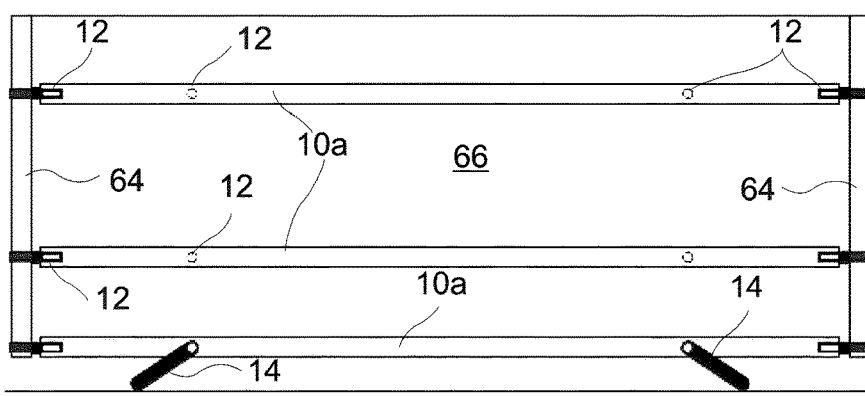

FIG. 28 shows a construction of a shelf, with a plurality of supporting structures 10 being provided on the positioning elements 14, one above the other, which have interfaces 12 on their outer sides for the coupling of side walls 64. On the right-hand side, a luminaire 26 is also coupled to the interface 12.

Figure 29:
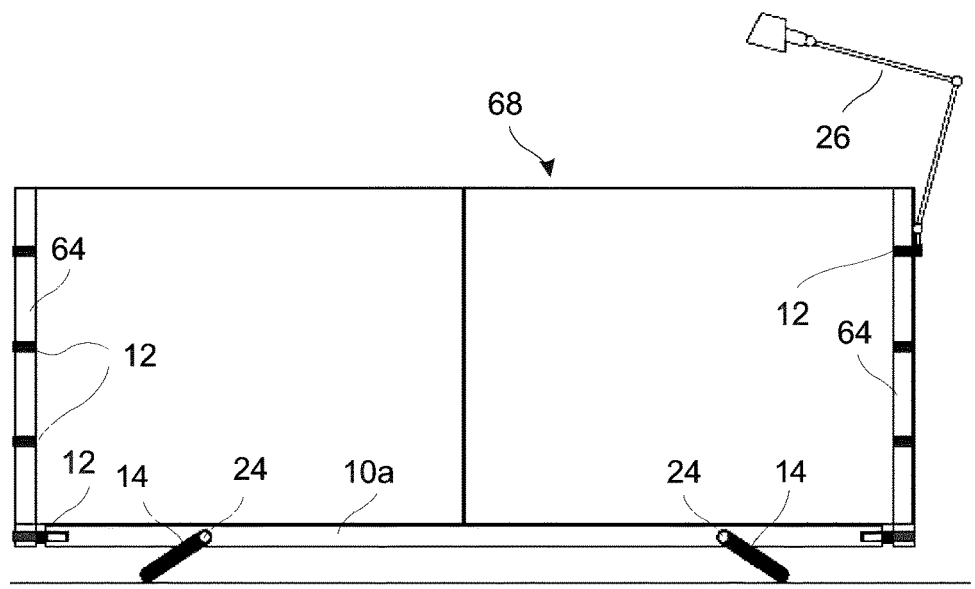

FIG. 29 shows a construction of a cabinet with positioning elements 14 fastened to the supporting structure 10 on one side and side walls 64 on the other side, which are arranged on the outside. A luminaire 26 is also attached to cabinet 68 at the interface 12 at the top right.

Figure 30:
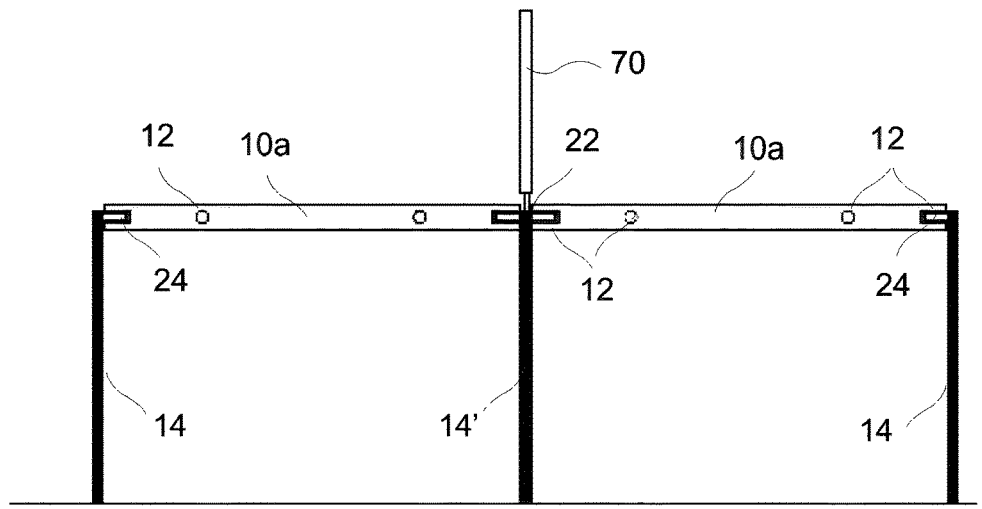

FIG. 30 shows an embodiment in which positioning elements 14 are attached to the outside of two supporting structures 10 with their mating parts 24 at the interface 12. The two elements are coupled together in the middle by a coupling element 22, to which a positioning element 14' is attached. At the coupling element 22, a partition wall 70 projects upwards and separates the two work surfaces formed as a result.

Figure 31:
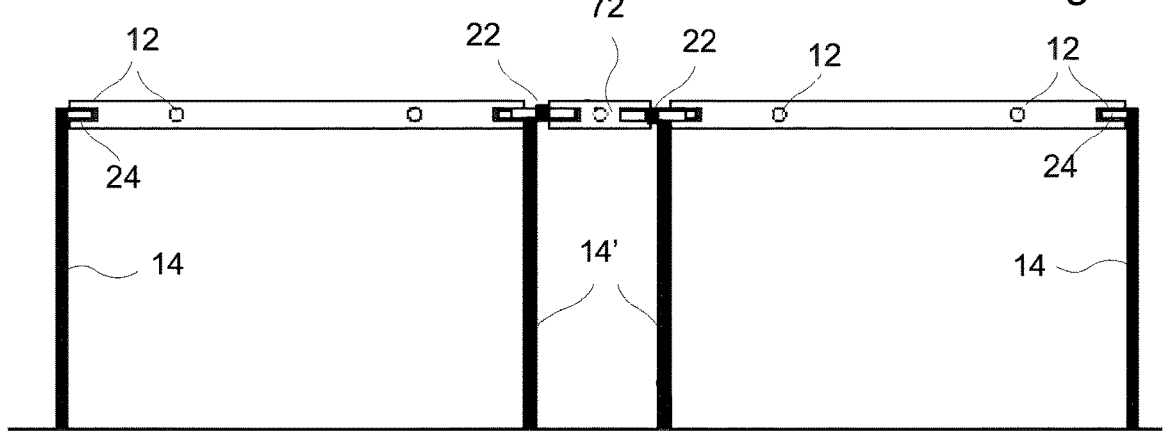

FIG. 31 shows the arrangement of a cable duct 72 between two supporting structures 10. Coupling elements 22 are used to fix the cable duct 72 in the middle. Two positioning elements 14' are also provided centrally at the coupling elements 22.

Figure 32:
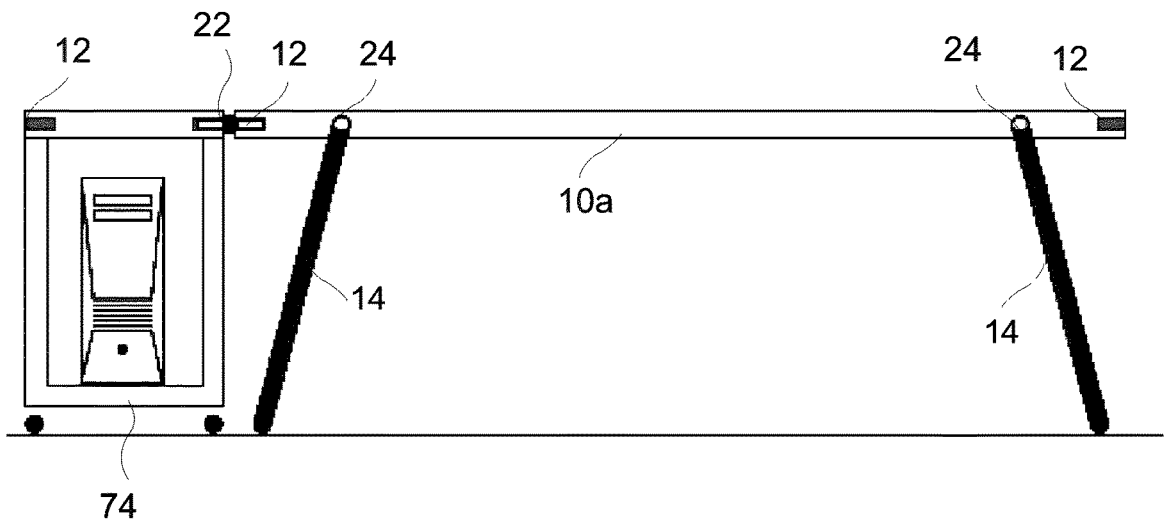

FIG. 32 shows the attachment of a container equipped as a CPU holder 74. This container is also attached by means of the coupling element 22 to an interface 12 of the supporting structure 10, which in turn is placed on the floor by means of positioning elements 14.

FIGS. 33a to 43b show different embodiments of the interfaces 12 with regard to their arrangement in the recesses 13 of the supporting structure 10 as well as the arrangement and securing of the mating parts 24 in relation to the interfaces 12.

Figure 33A:
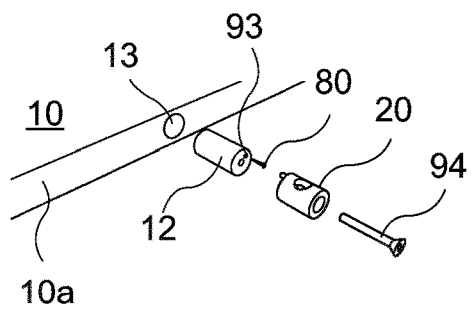
Figure 33B:
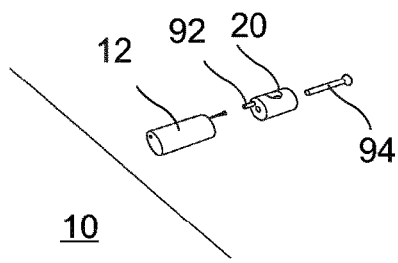
Figure 33C:
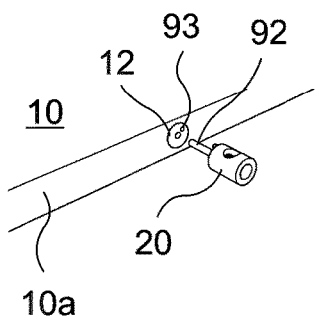
Figure 33D:
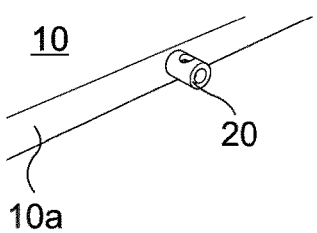

FIGS. 33a to 33d show an arrangement of an anti-rotation device 80 which is eccentric in relation to a central axis of the cylindrical interface 12 and which consists of an element such as a screw, thus fixing the interface 12 in the axial direction to the supporting structure 10. The eccentric arrangement also secures the interface 12 simultaneously against rotation relative to the supporting structure 10. In FIG. 33a it can be seen that the interface 12 is matched to the cylindrical recess 13 in the edge 10a of the supporting body. According to FIG. 31a, the interface has an eccentric hole 93, at the end of which there is a passage opening smaller in diameter than the hole 93, through which passage opening the anti-rotation device 80 on the supporting body can secure the interface 12 against rotation. In this embodiment, an additional interface 20 is fastened to the interface 12 integrated in the supporting body 10 in FIG. 34c, with the fastening being made by an anti-rotation device 92, which is also arranged eccentrically. According to FIG. 33b, the anti-rotation lock is an eccentrically arranged pin on the supplementary interface, which pin is inserted in a positive-locking manner into the hole 93 according to FIG. 33b when the supplementary interface is fastened. The supplementary interface 20 is then fixed, against detachment, to the interface with the screw-type securing means 94, so that in the assembled state a representation according to FIG. 33d is obtained.

FIG. 34 shows different embodiments for securing the interface 12 in the recesses 13 of the supporting structure 10 against rotation. In this case, the interfaces 12 are cylindrical and the recesses 13 in the supporting structure 10 are also formed by cylindrical holes. The interfaces 12, at their end which is to be directed towards the recesses 13, have anti-rotation devices 80, which are secured by a number of elements in the embodiment, so that the interfaces 12 are already secured against rotation of the interface 12 in relation to the supporting structure 10 after engagement in the supporting structure 10.

At the same time, however, a securing means 84 to prevent unintentional detachment of the interfaces 12 from the supporting structure 10 should be ensured. This can be achieved firstly by mechanically connecting or screwing the interface 12 to the supporting structure 10, as shown in the embodiment on the right in FIG. 34. There, the anti-rotation devices 80 are constructed as screws, for example.

It is also conceivable to actively clamp the interface 12 with the supporting structure 10 by means of integrally formed parts 86. The integrally formed parts 86 can be transverse ribs or longitudinal ribs, as shown in the two middle embodiments in FIG. 34. If the interfaces 12 are pressed into the recesses 13, the integrally formed parts 86 come into contact with the wall of the recess 13, thus providing appropriate protection against unintentional detachment. A materially bonded connection can also be achieved, as shown in the left-hand illustration in FIG. 34, by applying an adhesive to the periphery of the interface 12, so that the interface 12 is materially bonded to the recess 13.

FIGS. 35a, 35b show a further anti-rotation device 80 to prevent the interface from rotating relative to the supporting structure 10. In this case, the recess is formed by a slot, rounded at its ends. The interface 12 has a congruent shape, so that, after inserting the interface 12 into the recess 13, a positive-locking connection 82 between interface 12 and supporting structure can be created.

FIGS. 36a, 36b firstly show in FIG. 36a how the interface 12 is attached in a positive-locking connection in the recess 13. A corresponding mating part 24 can be fastened to the interface 12, which is accommodated in a positive-locking connection in the supporting structure 10 in FIG. 36b and which, in the embodiment, has a connection means 91, for example for connecting a positioning element 14. Screws 83 are provided as a securing means 84 against unintentional detachment of the interface from the supporting structure as well as of the mating part 24 from the interface 12. If these screws are only used as a securing means 94 against unintentional detachment from the interface 12, they end in the interface 12. If these screws are to provide additional securing of the interface 12 in the recess 13, the screws 83 extend into the supporting structure 10. FIG. 36c shows the unit consisting of mating part 24 and connection means 91 arranged on the supporting structure 10 in the interface 12.

FIGS. 37a and 37b show an embodiment of a securing means 84 of the interface 12 to prevent unintentional detachment from the supporting structure 10, which securing means is formed by a manually actuatable engagement element 88. This is an eccentric insert which is fixed to the interface 12. After inserting the interface 12 into the recess 13, the manually actuatable engagement element 88 is in the position shown in FIG. 37a. If the engagement element 88 is now actuated, it is in the position shown in FIG. 37b, which ensures that it cannot be unintentionally detached from or pulled out of the supporting structure 10.

In FIGS. 35a to 37b, the interface 12 also has a plurality of adjacently arranged attachment points for attachment of the mating part, so that the forces occurring when the furniture is in use can be reliably transferred from support body 10 to the mating part 14. It is also possible to connect a mating part 24 or positioning element 14 or accessory to a number of interfaces 12.

FIGS. 38a to 38c show an embodiment which is necessary if the supporting structure placed on a ground surface is overdetermined, since in this case a level control 90 is advantageous. In the embodiment, the interface 12 is formed by a cylindrical receptacle into which a cylindrical sleeve is inserted as mating part 24. This can be secured there in the above-mentioned manner. A bearing element 89 is provided on the positioning element 14, on which bearing element a level control 90 is mounted in a height-adjustable manner. In the state arranged on the supporting structure 10, a representation according to FIG. 38c is obtained, in which an alignment of the supporting structure 10 can be carried out by turning the level control 90. The level control 90 is provided on at least one positioning element 14; in FIG. 39c it is fitted to all positioning elements 14. By means of the level control, the supporting structure 10 can be aligned parallel to the ground or floor or can be placed horizontally in water, if necessary, for example to compensate for manufacturing tolerances.

To prevent the mating parts 24 from rotating, a plurality of mating parts 24 can also be connected to each other by means of a connecting element 102 as shown in FIG. 38d. In FIG. 38d, these mating parts 24 are arranged diametrically opposite each other and are provided for fastening a positioning element 14. The mating parts 24 are thus secured against detachment from the supporting structure 10. In addition, the connecting element 102 can be used to support the supporting structure 10.

Figure 43A:
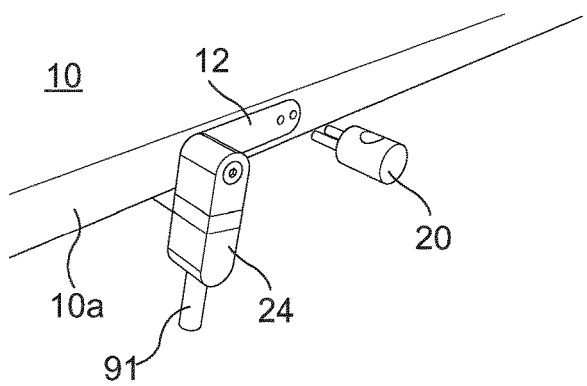
Figure 43B:
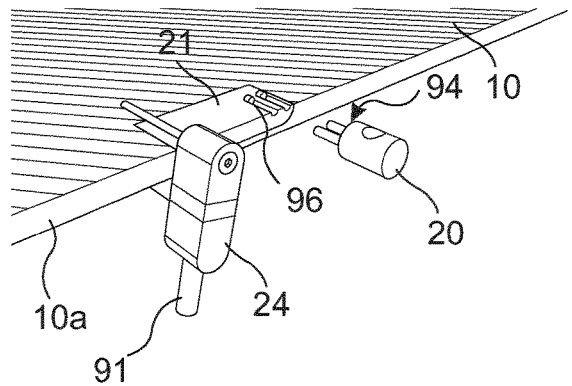

In the representation of FIG. 38a-38d, but also in FIG. 39a-39e as well as FIGS. 43a, 43b, an abutment is also provided as an anti-rotation device, since the components are in contact with the bottom of the tabletop after a certain rotation of the positioning element 14 relative to the supporting structure 10 and thus prevent further rotation in this one direction, or in the other direction if the opposite mating part is rotated, for example in the other direction (left and right positioning element 14). In addition, it is also possible in principle, in a manner not shown in the drawings, to secure a mating part with, for example, a supplementary interface for accessories or a mating part 24 with a supplementary interface 20 for accessories and a positioning element against rotation in both directions, for example by placing it flat against the underside of the tabletop, i.e. the supporting structure 10, to provide support in both directions.

FIGS. 39-39e show, in another embodiment, a securing of the mating part 24 at the interface 12 by means of an undercut 100. According to FIG. 39a, the interface 12 is formed externally by a cylindrical receptacle which is accommodated in the recess of the supporting structure 10. According to FIGS. 39c to 39e, this is a sleeve fixed in the supporting structure with two elements 80 to prevent rotation, which sleeve, however, also accommodates a locking element 104. For this purpose, the locking element 104 has an opening into which an undercut 100, comparably to a key bit, can enter in one position and is locked in the other position. When the mating part 24 is transferred from the position according to FIG. 39a to the position mounted on the supporting structure 10 according to FIG. 39b, the undercut 100 enters into the opening 12a in the interface 12. At the same time, the mating part 24 has a contact element 24a which is guided under the supporting structure 10. By clamping the supporting structure 10 with the contact element 24a, the positioning element can be positioned first. In the position thus formed, the undercut 100 is turned into the locked position, in which it engages with the locking element 104, resulting in the position as shown in FIG. 39c. At the bottom, the supporting structure 10 is secured by clamping between contact element 24a and the engagement of the mating part 24 in the interface. At the top, it is secured by the abutment and against unintentional detachment by the undercut 100.

Figure 40A:
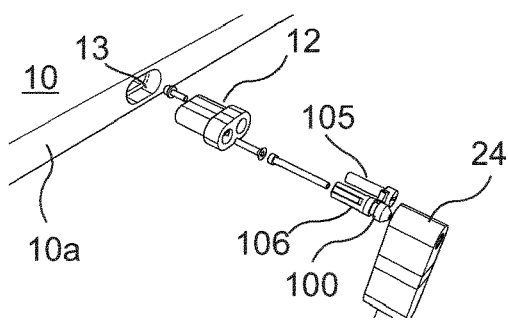
Figure 40B:
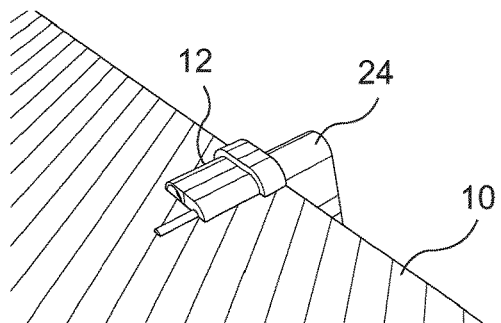
Figure 40C:
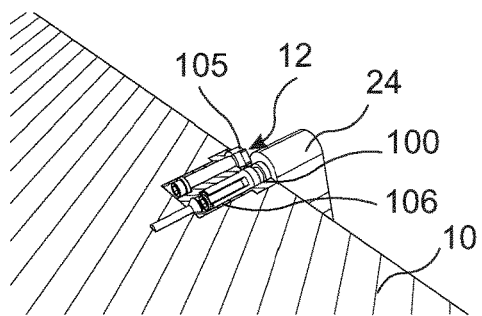
Figure 40D:
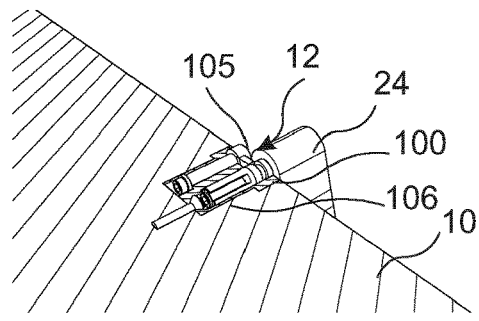
Figure 41A:
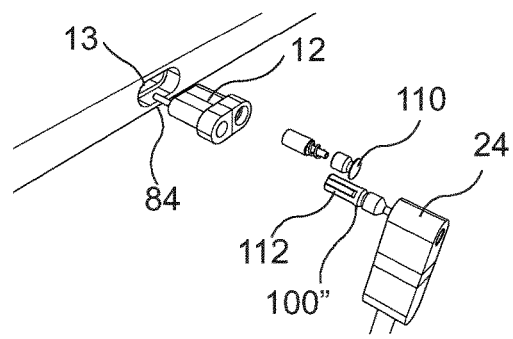
Figure 41B:
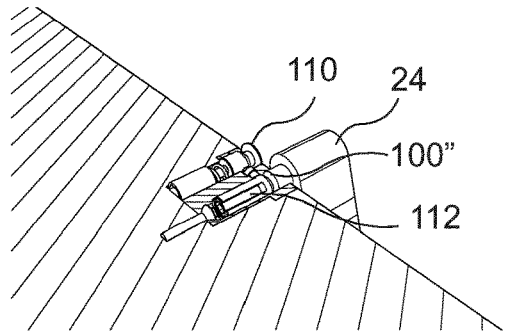
Figure 41C:
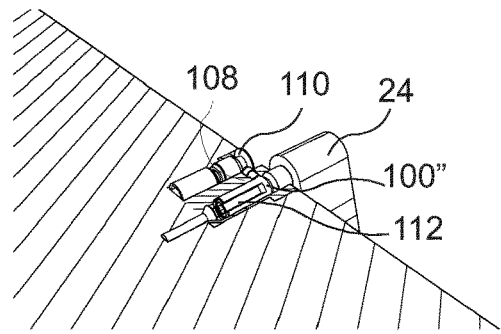
Figure 41D:
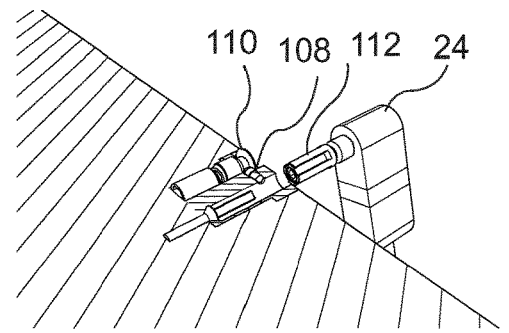

A construction as shown in FIGS. 40a-40d also uses an undercut 100', but in this case a rotary lock 105 is used. Firstly, the interface 12 is accommodated in a recess 13 in the supporting structure 10. The interface has two openings, with the mating part 24 being fixed in one opening as shown in FIG. 40a. In the embodiment this is a bolt, which is fixed to the mating part 24 with a screw. The rotary lock 105 is supported in the second opening, and, depending on the position, engages in an undercut 100' of a locking bolt 106, so that it can be locked together with the mating part 24 at the interface 12 according to FIG. 40d. In the position according to FIG. 40c, however, there is no locking, as the rotary lock 105 does not yet engage in the undercut 100. For locking, the cover element of the rotary lock 105 of the second opening and thus the rotary lock 105 can be rotated in its longitudinal direction, with the rotary lock 105 thereby engaging in the undercut 100'.

FIGS. 41a-41d show a solution in which a locking element 108 is actuated by a push button 110 so that the locking element engages and disengages with an undercut 100". According to FIG. 41a, the interface 12 is fastened to the supporting structure 10 by way of a securing means 84. It also has a shape that is congruent with the slot-like design of the recess 13. The push button 110, which is mounted in spring-loaded fashion in the right opening of the interface 12, can also be seen. The mating part 24 has a corresponding connection element 112 according to FIG. 41a, which is inserted into the left opening of the interface and has the undercut 100". In the assembled state according to FIG. 41b, the push button 110 is approximately flush with the edge of the supporting structure 10. If the push button 110 is pressed into the supporting structure 10 according to FIG. 41c, a free space is created, into which the locking element 108 can enter, so that the hole in which the connection element 112 is located is freed and the mating part 24 can be pulled out of the hole according to FIG. 41d. If the push button 110 is released, the locking element 108 enters the hole again, but is displaced by the axial movement of the connection element 112 when a mating part is next fixed.

Figure 42A:
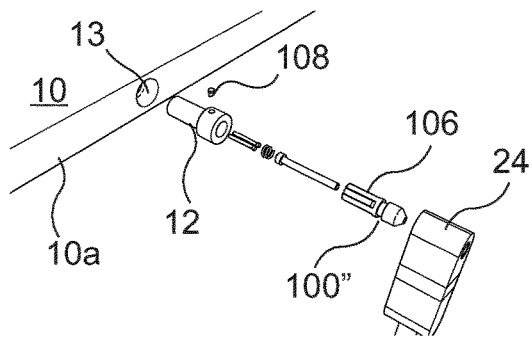
Figure 42B:
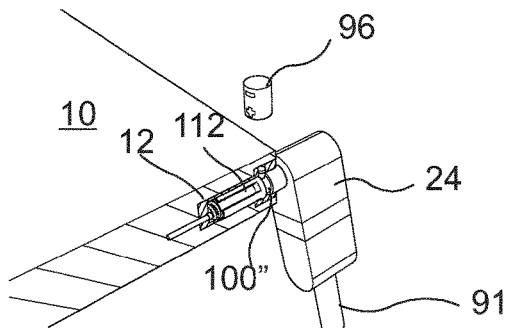
Figure 42C:
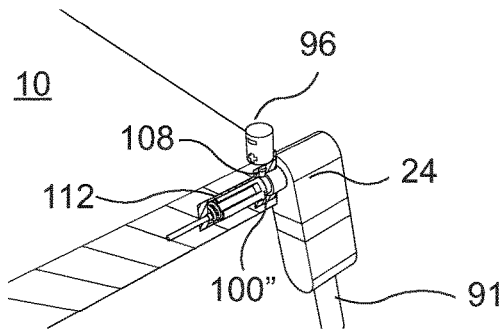

FIGS. 42a-42d show an alternative embodiment for fixing and securing the mating part 24 against unintentional detachment from the interface 12 by means of magnetic forces. According to FIG. 42a, a cylindrical recess 13 is provided in the supporting structure 10, into which recess the interface 12 is inserted. The interface 12 has a hole in which a locking element 108 is mounted so that it can move transversely to the hole. In the assembled state as shown in FIG. 42b, the interface 12 contains the connection element 112, which is provided with an undercut 100" and with which the mating part 24 can be fixed to the interface 12. As in the previous embodiments, the mating part 24 has a connection means, for example for a positioning element 14.

Figure 42D:
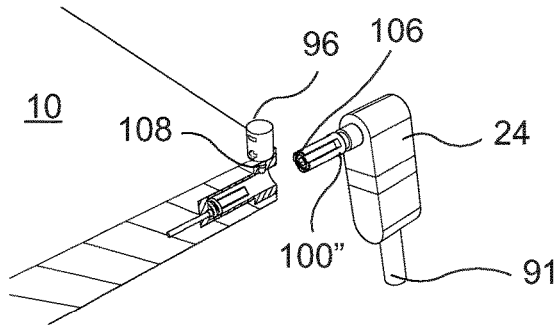

In this assembled position, a magnet 96 can be brought close to the top side of the supporting structure 10 so that the locking element 108 can be moved out of the undercut 100", so that the hole in which the connection element 112 is located is released and the mating part 24 can be removed from the supporting structure 10 as shown in FIG. 42d.

FIGS. 43a, 43b show an embodiment in which, in this case, a supplementary interface 20 is held force-lockingly by magnetic forces on the supporting body 10. A comparable arrangement is also possible for securing the mating part 24 to an interface 12 or for fixing an interface 12 to the supporting body 10. In this case there are located in the holes 114, which can be seen in the sectional view in FIG. 43b, magnets 96' arranged, preferably pressed in, so that, when the supplementary interface 20 is inserted in the holes, it is held there force-lockingly and can only be released again by overcoming the magnetic forces.

Although not shown in the drawings, it is also possible, for example, to attach a positioning element 14 secured by magnetic forces to the supporting structure 10 by means of magnetic forces and at the same time to make it easily detachable. If a magnetic securing means is created at a certain angular position of the magnets between mating part 24 and interface 12, the magnetic forces can be easily cancelled by turning the mating part 24 or the positioning element 14, so that the positioning element 14 can be detached from the supporting structure 10.

It goes without saying that this description can be subject to a wide range of modifications, changes and adaptations which are within the range of equivalents to the accompanying claims.

The invention claimed is:

1. A system for constructing a piece of furniture, screens or an exhibition stand, said system comprising
   a supporting structure formed by a panel-like element and comprising a surface or at least partially surrounding a surface, the supporting structure further comprising a plurality of side edges, with interfaces being provided on at least two opposite side edges, which interfaces are configured for a connection to further system components and are provided only laterally in the side edges,
   a plurality of positioning elements which are releasably fastened in at least one of a positive-locking and force-locking manner to the interfaces of the at least one supporting structure and support the supporting structure downwards in a direction of a floor,
   wherein the interfaces, which are separate from the supporting structure, are at least partially integrated into the supporting structure and are arranged in recesses which are provided in the side edges, and wherein the positioning elements are configured to be fixed at the interfaces by a mating part to the respective interface,
   wherein the supporting structure formed by the panel-like element is configured only laterally for the connection with the positioning elements at the interfaces, while the supporting structure is untouched by the positioning elements on other surfaces thereof in such a manner, that the supporting structure is reversible so that it is usable on both sides,
   wherein the positioning elements are mountable transversely to the surface of the supporting structure and are configured to be fixed in a desired position in space, and
   wherein the mating part comprises a securing to prevent unintentional detachment of the mating part from the interface.

2. A system according to claim 1, wherein the positioning elements are mountable perpendicularly to the surface of the supporting structure.

3. A system according to claim 1, wherein the interface is an insert arranged at least partially in the recess.

4. A system according to claim 1, comprising at least one of the features that
at least one positioning element is a leg for setting up the supporting structure,
at least one positioning element is configured to adjust the height of the supporting structure or is a lifting column.

5. A system according to claim 1, wherein at least one positioning element is configured to fasten at least one of the following further system components: a seat surface, a lying surface, a set-down surface, a leaning surface, a headrest, an armrest), a backrest.

6. A system according to claim 1, wherein accessory elements are mounted to at least one of the interfaces for fastening the positioning elements and additional supplementary interfaces provided on the side edges of the supporting structure.

7. A system according to claim 6, wherein the accessory elements are mounted to the positioning elements attached at the interfaces.

8. A system according to claim 7, wherein a plurality of different interfaces is configured to be combined in one insert.

9. A system according to claim 1, wherein coupling elements are mountable to the interfaces for a coupling to interfaces of further supporting structures.

10. A system according to claim 9, wherein a positioning element is configured to be simultaneously the coupling element.

11. A system according to one claim 1, wherein the positioning elements are mountable to the interfaces by a mating part complementary to the interface.

12. A system according to claim 1, wherein the interface comprises an anti-rotation device to prevent the interface from rotating relative to the supporting structure.

13. A system according to claim 1, wherein the interface comprises a securing to prevent unintentional detachment from the supporting structure, which securing is formed by at least one of the following features:
mechanically connecting or screwing of the interface to the supporting structure,
materially bonded connecting of the interface to the supporting structure,
passive clamping of the interface with the supporting structure using integrally formed parts,
active clamping of the interface with the supporting structure using manually actuatable engagement elements.

14. A system according to claim 1, wherein a level control for aligning the supporting structure is provided on at least one positioning element and acts between the at least one positioning element and the supporting structure.

15. A system according to claim 1, wherein the mating part comprises an anti-rotation device to prevent the mating part from rotating relative to the interface.

16. A system according to claim 1, wherein the securing to prevent unintentional detachment of the mating part from the interface is formed by at least one of the following features:
force- and positive-locking connecting of the mating part to the interface,
force-locking connecting of the mating part to the interface by means of magnetic forces,
a securing in an undercut,
connecting a plurality of mating parts to each other.

17. Supporting structure for a piece of furniture comprising interfaces, the supporting structure being formed by a panel-like element and comprising at least one of a surface and at least partially surrounding a surface, the supporting structure comprising a plurality of side edges, with the interfaces being provided on at least two opposite side edges and being configured for a connection to further system components,
wherein the interfaces of the supporting structure are arranged in the side edges of the supporting structure and separate from the supporting structure and are configured to releasably fasten a plurality of positioning elements in at least one of a positive-locking and force-locking manner and to support the supporting structure downwards in the direction of the floor,
wherein the interfaces are at least partially integrated into the supporting structure and are arranged in recesses which are provided in the side edges only laterally, and
wherein the positioning elements are configured to be fixed to the interfaces by a mating part to the respective interface,
wherein the supporting structure formed by the panel-like element is configured only laterally for the connection with the positioning elements at the interfaces, while the supporting structure itself is untouched by the positioning elements on the other surfaces thereof in such a manner, that the supporting structure is reversible, so that it is usable on both sides,
wherein the interfaces are configured to mount the positioning elements transversely to the surface of the supporting structure and are configured to be fixed in any desired position in space, and
wherein the interface is configured to secure the mating part by a securing to prevent unintentional detachment of the mating part from the interface via the securing.

18. A supporting structure according to claim 17, wherein the interfaces are configured to mount the positioning elements perpendicularly to the surface of the supporting structure.

19. A supporting structure according to claim 17, wherein the interface is an insert arranged at least partially in the recess.

20. A supporting structure according to claim 17, wherein the interface is configured to fasten at least one positioning element as a leg or as a lifting column for setting up and/or supporting the supporting structure.

21. A supporting structure according to 17, wherein the supporting structure comprises at least one of the interfaces and additional supplementary interfaces provided at the side edges, which interfaces are configured to fasten at least one of the following elements to the supporting structure: a seat surface, a lying surface, a set-down surface, a leaning surface, a headrest, an armrest, a backrest or at least one accessory element comprising a luminaire, a cable duct, a partition wall, a screen holder, an add-on table, a bin, a shelf, a storage compartment, a plant container, a structural element, an adjusting part, a branding element or supporting and holding elements for office accessories, power and data line connections and IT equipment.

22. A supporting structure according to claim 17, wherein coupling elements are configured to be fastened to the interfaces for a coupling to interfaces of further supporting structures.

23. A supporting structure according to claim 17, wherein the interface is attachable to the supporting structure in using an anti-rotation device to prevent the interface from rotating relative to the supporting structure.

24. A supporting structure according to claim 17, wherein the interface is attachable to the supporting structure by way of a securing to prevent the supporting structure from being unintentionally detached.

\* \* \* \* \*